(12) United States Patent
Howard et al.

(10) Patent No.: US 7,711,762 B2
(45) Date of Patent: May 4, 2010

(54) EFFICIENT COMPUTATION FOR EIGENVALUE DECOMPOSITION AND SINGULAR VALUE DECOMPOSITION OF MATRICES

(75) Inventors: Steven J. Howard, Ashland, MA (US); John W. Ketchum, Harvard, MA (US); Mark S. Wallace, Bedford, MA (US); Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1284 days.

(21) Appl. No.: 11/096,839

(22) Filed: Mar. 31, 2005

(65) Prior Publication Data

US 2006/0106902 A1    May 18, 2006

Related U.S. Application Data

(60) Provisional application No. 60/628,324, filed on Nov. 15, 2004.

(51) Int. Cl.
*G06F 17/16* (2006.01)
(52) U.S. Cl. ...................................... 708/490
(58) Field of Classification Search ........................ None
See application file for complete search history.

(56) References Cited

U.S. PATENT DOCUMENTS

| | | | |
|---|---|---|---|
| 6,859,747 B2 | 2/2005 | Yutkowitz | |
| 7,065,144 B2 * | 6/2006 | Walton et al. ................ | 375/260 |
| 7,298,805 B2 | 11/2007 | Walton et al. | |
| 7,327,800 B2 | 2/2008 | Oprea et al. | |
| 2005/0047515 A1 * | 3/2005 | Walton et al. ................ | 375/267 |
| 2005/0267925 A1 | 12/2005 | Clue | |
| 2006/0056531 A1 | 3/2006 | Li et al. | |
| 2006/0067277 A1 | 3/2006 | Thomas et al. | |
| 2006/0155798 A1 * | 7/2006 | Ketchum et al. ............. | 708/607 |
| 2006/0285531 A1 * | 12/2006 | Howard et al. ............... | 370/343 |
| 2007/0249296 A1 | 10/2007 | Howard et al. | |

FOREIGN PATENT DOCUMENTS

WO    2005114868    12/2005

OTHER PUBLICATIONS

Grant R. Griffin, "Cordic Faq," Iowegian's dspGuru. pp. 1-6.

(Continued)

*Primary Examiner*—David H Malzahn
(74) *Attorney, Agent, or Firm*—Thien T. Nguyen; Ross L. Franks

(57) ABSTRACT

For eigenvalue decomposition, a first set of at least one variable is derived based on a first matrix being decomposed and using Coordinate Rotational Digital Computer (CORDIC) computation. A second set of at least one variable is derived based on the first matrix and using a look-up table. A second matrix of eigenvectors of the first matrix is then derived based on the first and second variable sets. To derive the first variable set, CORDIC computation is performed on an element of the first matrix to determine the magnitude and phase of this element, and CORDIC computation is performed on the phase to determine the sine and cosine of this element. To derive the second variable set, intermediate quantities are derived based on the first matrix and used to access the look-up table.

46 Claims, 6 Drawing Sheets

OTHER PUBLICATIONS

Nowak et al., "An Efficient Implementation of a 256-point FFT Processor with CORDIC for OFDM Systems," Delft University of Technology, Faculty of Information Techology and System Circuits and Systems Group. ISBN: 90-73461-15-4. 1998. STW, 1998 10 26-01:073. pp. 427-434.

Javieer Oscar Giacomantone, "Tradeoffs in Arithmetic Architectures for Cordic Algorithm Design." CeTAD—Fac. De Ingenieria-UNLP.

Gotze, J. Et Al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Hemkumar N. D., Et Al. "Efficient Complex Matrix Transformations with CORDIC" Computer Arithmetic, 1994 Proceedings., 11th Symposium on Windsor, Ont., Canada Jun. 29-Jul. 2, 1993, Los Alamitos, CA, USA, IEEE Comput. Soc, Jun. 29, 1993, pp. 122-129.

Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

Kim, M. et al.: "Design of Jacobi EVD Processor Based on CORDIC for DOA Estimation with Music Algorithm" Personal, Indoor, and Mobile Radio Communications, 2002. pp. 120-124, The 13th IEEE International Symposium on Sep. 15-18, 2002, Piscataway, NJ, USA, IEEE.

Michalke C Et Al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C, pp. 2847-2851, XP010678152.

Oksa G Et Al: "Multi-level parallelism in the block-jacobi SVD algorithm" Parallel and Distribution Processing, 2001 Proceedings. Ninth Euromicr O Workshop. IEEE, Feb. 7, 2001, pp. 306-313, XP010532138, ISBN: 978-0-7695-0987-7.

Schafer F., et al.: "Efficient Tracking of Eigenspaces and its application to MIMO systems" Proceedings of the IST Mobile and Wireless Communications Summit, Jun. 18, 2003, pp. 1-6, XP002478514.

Seeger, R. et al.: "Advanced Eigenbeamforming for the 3GPP UMTS FDD Downlink" ITG IEEE Workshop on Smart Antennas, XX, XX, Apr. 4, 2004, pp. 1-8, XP002468805, Section III.

International Search Report—PCT/US05/041784—International Search Authority, European Patent Office, May 30, 2008.

International Preliminary Report on Patentability—PCT/US2005/041784, International Search Authority-The International Bureau of WIPO, Geneva, Switzerland—Jun. 18, 2008.

Written Opinion-PCT/US2005/041784, International Search Authority—European Patent Office—May 30, 2008.

Bello: "Characterization of Randomly Time-Veriante Linear Channels," Communications Systems, IEEE transactions on, vol. 11, Issue 4, pp. 360-393, Dec. 1963.

Choi, et al.: "Interpolation Based Transmit Beamforming for MIMO-OFDM with Limited Feedback." 2004 IEEE International Conference in Paris, France, pp. 249-253, Jun. 20, 2004.

* cited by examiner

EFFICIENT COMPUTATION FOR EIGENVALUE DECOMPOSITION AND SINGULAR VALUE DECOMPOSITION OF MATRICES

CLAIM OF PRIORITY UNDER 35 U.S.C. §119

The present Application for Patent claims priority to Provisional Application Ser. No. 60/628,324, entitled "Eigenvalue Decomposition and Singular Value Decomposition of Matrices Using Jacobi Rotation," filed Nov. 15, 2004, assigned to the assignee hereof, and hereby expressly incorporated by reference herein.

BACKGROUND

I. Field

The present invention relates generally to communication, and more specifically to techniques for decomposing matrices.

II. Background

A multiple-input multiple-output (MIMO) communication system employs multiple (T) transmit antennas at a transmitting entity and multiple (R) receive antennas at a receiving entity for data transmission. A MIMO channel formed by the T transmit antennas and the R receive antennas may be decomposed into S spatial channels, where $S \leq \min\{T, R\}$. The S spatial channels may be used to transmit data in a manner to achieve higher overall throughput and/or greater reliability.

The MIMO channel response may be characterized by an R×T channel response matrix H, which contains complex channel gains for all of the different pairs of transmit and receive antennas. The channel response matrix H may be diagonalized to obtain S eigenmodes, which may be viewed as orthogonal spatial channels of the MIMO channel. Improved performance may be achieved by transmitting data on the eigenmodes of the MIMO channel.

The channel response matrix H may be diagonalized by performing either singular value decomposition of H or eigenvalue decomposition of a correlation matrix of H. The singular value decomposition provides left and right singular vectors, and the eigenvalue decomposition provides eigenvectors. The transmitting entity uses the right singular vectors or the eigenvectors to transmit data on the S eigenmodes. The receiving entity uses the left singular vectors or the eigenvectors to receive data on the S eigenmodes.

Eigenvalue decomposition and singular value decomposition are computationally intensive. There is therefore a need in the art for techniques to efficiently decompose matrices.

SUMMARY

Techniques for efficiently decomposing matrices are described herein. According to an embodiment of the invention, a method is provided in which a first set of at least one variable (e.g., cosine $c_1$, sine $s_1$, and magnitude r) is derived based on a first matrix to be decomposed and using Coordinate Rotational Digital Computer (CORDIC) computation. A second set of at least one variable (e.g., variables c and s) is derived based on the first matrix and using a look-up table. A second matrix of eigenvectors is then derived based on the first and second sets of at least one variable.

According to another embodiment, an apparatus is described which includes a CORDIC processor, a look-up processor, and a post-processor. The CORDIC processor derives a first set of at least one variable based on a first matrix to be decomposed. The look-up processor derives a second set of at least one variable based on the first matrix and using a look-up table. The post-processor derives a second matrix of eigenvectors based on the first and second sets of at least one variable.

According to yet another embodiment, an apparatus is described which includes means for deriving a first set of at least one variable based on a first matrix to be decomposed and using CORDIC computation, means for deriving a second set of at least one variable based on the first matrix and using a look-up table, and means for deriving a second matrix of eigenvectors based on the first and second sets of at least one variable.

According to yet another embodiment, a method is provided in which CORDIC computation is performed on an element of a first matrix to determine the magnitude and phase of the element. CORDIC computation is also performed on the phase of the element to determine the sine and cosine of the element. A second matrix of eigenvectors is then derived based on the magnitude, sine, and cosine of the element.

According to yet another embodiment, an apparatus is described which includes means for performing CORDIC computation on an element of a first matrix to determine the magnitude and phase of the element, means for performing CORDIC computation on the phase of the element to determine the sine and cosine of the element, and means for deriving a second matrix of eigenvectors based on the magnitude, sine, and cosine of the element.

According to yet another embodiment, a method is provided in which intermediate quantities are derived based on a first matrix to be decomposed. At least one variable is then derived based on the intermediate quantities and using a look-up table. A second matrix of eigenvectors is derived based on the at least one variable.

According to yet another embodiment, an apparatus is described which includes a pre-processor, a look-up table, and a post-processor. The pre-processor derives intermediate quantities based on a first matrix to be decomposed. The look-up table provides at least one variable based on the intermediate quantities. The post-processor derives a second matrix of eigenvectors based on the at least one variable.

According to yet another embodiment, an apparatus is described which includes means for deriving intermediate quantities based on a first matrix to be decomposed, means for deriving at least one variable based on the intermediate quantities and using a look-up table, and means for deriving a second matrix of eigenvectors based on the at least one variable.

According to yet another embodiment, a method is provided in which multiple iterations of Jacobi rotation are performed on a first matrix of complex values with multiple Jacobi rotation matrices. Each Jacobi rotation matrix is derived by performing eigenvalue decomposition using CORDIC computation, a look-up table, or both. A unitary matrix with orthogonal vectors is then derived based on the multiple Jacobi rotation matrices.

According to yet another embodiment, an apparatus is described which includes means for performing multiple iterations of Jacobi rotation on a first matrix of complex values with multiple Jacobi rotation matrices and means for deriving a unitary matrix with orthogonal vectors based on the multiple Jacobi rotation matrices. Each Jacobi rotation matrix is derived by performing eigenvalue decomposition using CORDIC computation, a look-up table, or both.

According to yet another embodiment, a method is provided in which multiple matrices of complex values are obtained for multiple transmission spans. Multiple iterations of Jacobi rotation are performed on a first matrix of complex values for a first transmission span to obtain a first unitary matrix with orthogonal vectors. Each iteration of the Jacobi rotation utilizes eigenvalue decomposition using CORDIC computation, a look-up table, or both. Multiple iterations of the Jacobi rotation are performed on a second matrix of complex values for a second transmission span to obtain a second unitary matrix with orthogonal vectors. The first unitary matrix is used as an initial solution for the second unitary matrix.

According to yet another embodiment, an apparatus is described which includes means for obtaining multiple matrices of complex values for multiple transmission spans, means for performing multiple iterations of Jacobi rotation on a first matrix of complex values for a first transmission span to obtain a first unitary matrix with orthogonal vectors, and means for performing multiple iterations of the Jacobi rotation on a second matrix of complex values for a second transmission span to obtain a second unitary matrix with orthogonal vectors. Each iteration of the Jacobi rotation utilizes eigenvalue decomposition using CORDIC computation, a look-up table, or both. The first unitary matrix is used as an initial solution for the second unitary matrix.

Various aspects and embodiments of the invention are described in further detail below.

DETAILED DESCRIPTION

Figure 1:
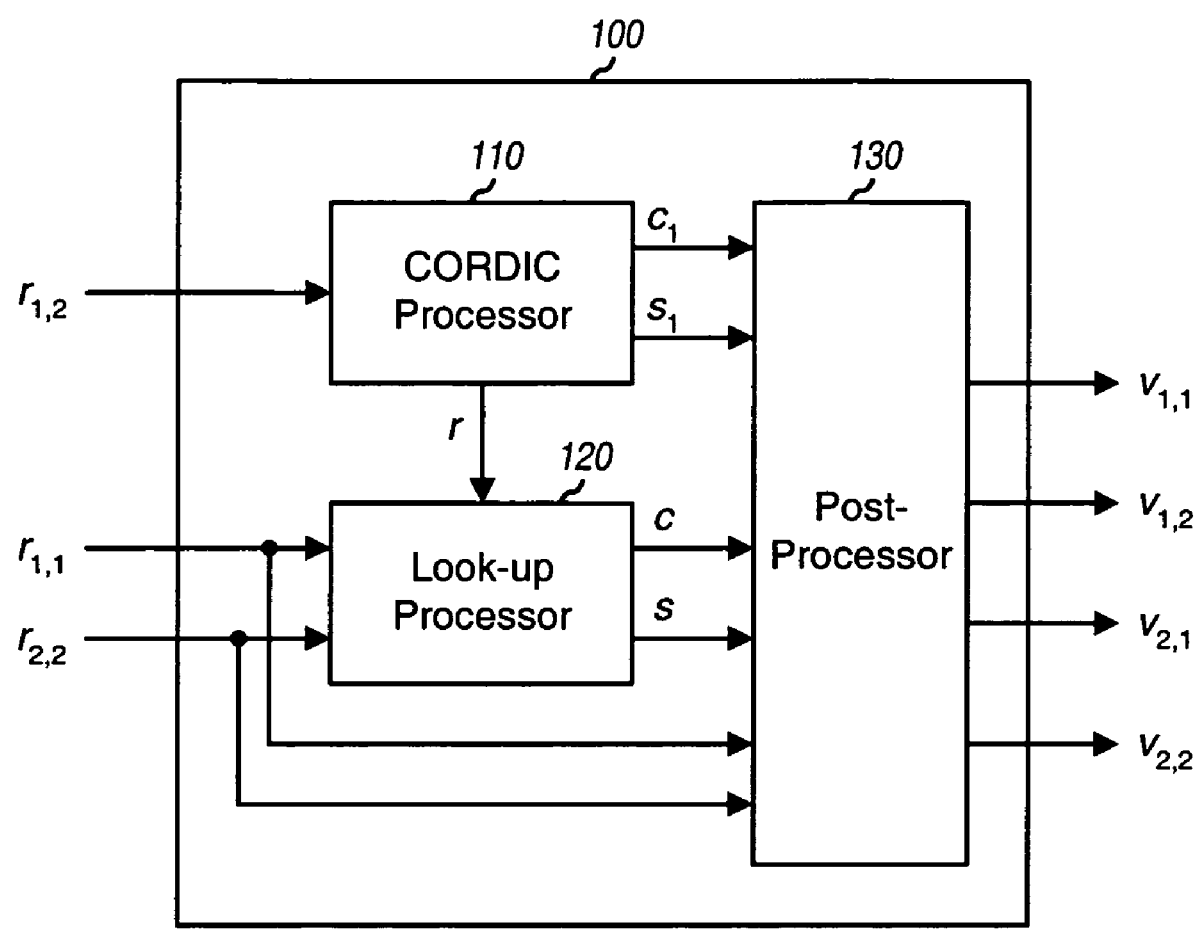
FIG. 1 shows a processing unit for eigenvalue decomposition of a 2×2 Hermitian matrix.

The word "exemplary" is used herein to mean "serving as an example, instance, or illustration." Any embodiment described herein as "exemplary" is not necessarily to be construed as preferred or advantageous over other embodiments.

The decomposition techniques described herein may be used for single-carrier and multi-carrier communication systems. Multiple carriers may be obtained with orthogonal frequency division multiplexing (OFDM), some other multi-carrier modulation techniques, or some other construct. OFDM effectively partitions the overall system bandwidth into multiple (K) orthogonal frequency subbands, which are also called tones, subcarriers, bins, and frequency channels. With OFDM, each subband is associated with a respective subcarrier that may be modulated with data. For clarity, much of the following description is for a single-carrier MIMO system.

A MIMO channel formed by multiple (T) transmit antennas and multiple (R) receive antennas may be characterized by an R×T channel response matrix H, which may be given as:

$$\underline{H} = \begin{bmatrix} h_{1,1} & h_{1,2} & \ldots & h_{1,T} \\ h_{2,1} & h_{2,2} & \ldots & h_{2,T} \\ \vdots & \vdots & \ddots & \vdots \\ h_{R,1} & h_{R,2} & \ldots & h_{R,T} \end{bmatrix}, \quad \text{Eq (1)}$$

where entry $h_{i,j}$, for $i=1, \ldots, R$ and $j=1, \ldots, T$, denotes the coupling or complex channel gain between transmit antenna j and receive antenna i.

The channel response matrix H may be diagonalized to obtain multiple (S) eigenmodes of H, where $S \leq \min\{T, R\}$. The diagonalization may be achieved by performing either singular value decomposition of H or eigenvalue decomposition of a correlation matrix of H.

The eigenvalue decomposition may be expressed as:

$$\underline{R} = \underline{H}^H \cdot \underline{H} = \underline{V} \cdot \Lambda \cdot \underline{V}^H, \quad \text{Eq (2)}$$

where $\underline{R}$ is a T×T correlation matrix of H;

V is a T×T unitary matrix whose columns are eigenvectors of H;

$\Lambda$ is a T×T diagonal matrix of eigenvalues of $\underline{R}$; and

"$^H$" denotes a conjugate transpose.

The unitary matrix V is characterized by the property $V^H \cdot V = I$, where I is the identity matrix. The columns of the unitary matrix are orthogonal to one another, and each column has unit power. The diagonal matrix $\Lambda$ contains possible non-zero values along the diagonal and zeros elsewhere. The diagonal elements of $\Lambda$ are eigenvalues of $\underline{R}$. These eigenvalues are denoted as $\{\lambda_1, \lambda_2, \ldots, \lambda_S\}$ and represent the power gains for the S eigenmodes. $\underline{R}$ is a Hermitian matrix whose off-diagonal elements have the following property: $r_{i,j} = r_{j,i}^*$, where "*" denotes the complex conjugate.

The singular value decomposition may be expressed as:

$$H = U \cdot \Sigma \cdot V^H, \quad \text{Eq (3)}$$

where

U is an R×R unitary matrix of left singular vectors of H;

$\Sigma$ is an R×T diagonal matrix of singular values of H; and

V is a T×T unitary matrix of right singular vectors of H.

U and V each contain orthogonal vectors. Equations (2) and (3) indicate that the right singular vectors of H are also the eigenvectors of $\underline{R}$. The diagonal elements of $\Sigma$ are the singular values of H. These singular values are denoted as $\{\sigma_1, \sigma_2, \ldots, \sigma_S\}$ and represent the channel gains for the S eigenmodes. The singular values of H are also the square roots of the eigenvalues of $\underline{R}$, so that $\sigma_i = \sqrt{\lambda_i}$ for $i=1, \ldots, S$.

A transmitting entity may use the right singular vectors in V to transmit data on the eigenmodes of H, which typically provides better performance than simply transmitting data from the T transmit antennas without any spatial processing. A receiving entity may use the left singular vectors in U or the eigenvectors in V to receive the data transmission on the eigenmodes of H. Table 1 shows the spatial processing performed by the transmitting entity, the received symbols at the receiving entity, and the spatial processing performed by the receiving entity. In Table 1, $\underline{s}$ is a T×1 vector with up to S data symbols to be transmitted, $\underline{x}$ is a T×1 vector with T transmit symbols to be sent from the T transmit antennas, $\underline{r}$ is an R×1 vector with R received symbols obtained from the R receive antennas, $\underline{n}$ is an R×1 noise vector, and $\hat{\underline{s}}$ is a T×1 vector with up to S detected data symbols, which are estimates of the data symbols in $\underline{s}$.

TABLE 1

| Transmit Spatial Processing | Received Vector | Receive Spatial Processing |
|---|---|---|
| $x = V \cdot s$ | $r = H \cdot x + n$ | $\hat{s} = \Sigma^{-1} \cdot U^H \cdot r$ |
| | | $\hat{s} = \Lambda^{-1} \cdot V^H \cdot H^H \cdot r$ |

Eigenvalue decomposition and singular value decomposition of a complex matrix may be performed with an iterative process that uses Jacobi rotation, which is also commonly referred to as Jacobi method or Jacobi transformation. The Jacobi rotation zeros out a pair of off-diagonal elements of the complex Hermitian matrix by performing a plane rotation on the matrix. For a 2×2 complex Hermitian matrix, only one iteration of the Jacobi rotation is needed to obtain the two eigenvectors and two eigenvalues for this matrix. For a larger complex matrix with dimension greater than 2×2, the iterative process performs multiple iterations of the Jacobi rotation to obtain the desired eigenvectors and eigenvalues, or singular vectors and singular values, for the larger complex matrix. Each iteration of the Jacobi rotation on the larger complex matrix uses the eigenvectors of a 2×2 submatrix, as described below.

Eigenvalue decomposition of a simple 2×2 Hermitian matrix $\underline{R}_{2\times2}$ may be performed as follows. The Hermitian matrix $\underline{R}_{2\times2}$ may be expressed as:

$$\underline{R}_{2\times2} = \begin{bmatrix} r_{1,1} & r_{1,2} \\ r_{2,1} & r_{2,2} \end{bmatrix} = \begin{bmatrix} A & B \cdot e^{j\theta_b} \\ B \cdot e^{-j\theta_b} & D \end{bmatrix}, \quad \text{Eq (4)}$$

where A, B, and D are arbitrary real values, and $\theta_b$ is an arbitrary phase.

The first step of the eigenvalue decomposition of $\underline{R}_{2\times2}$ is to apply a two-sided unitary transformation, as follows:

$$\underline{R}_{re} = \begin{bmatrix} 1 & 0 \\ 0 & e^{j\theta_b} \end{bmatrix} \cdot \begin{bmatrix} A & B \cdot e^{j\theta_b} \\ B \cdot e^{-j\theta_b} & D \end{bmatrix} \cdot \begin{bmatrix} 1 & 0 \\ 0 & e^{-j\theta_b} \end{bmatrix} = \begin{bmatrix} A & B \\ B & D \end{bmatrix}, \quad \text{Eq (5)}$$

where $\underline{R}_{re}$ is a symmetric real matrix containing real values and having symmetric off-diagonal elements at locations (1, 2) and (2, 1).

The symmetric real matrix $\underline{R}_{re}$ is then diagonalized using a two-sided Jacobi rotation, as follows:

$$\underline{\Lambda}_{2\times2} = \begin{bmatrix} \cos\phi & -\sin\phi \\ \sin\phi & \cos\phi \end{bmatrix} \cdot \begin{bmatrix} A & B \\ B & D \end{bmatrix} \cdot \begin{bmatrix} \cos\phi & \sin\phi \\ -\sin\phi & \cos\phi \end{bmatrix} = \begin{bmatrix} \lambda_1 & 0 \\ 0 & \lambda_2 \end{bmatrix}, \quad \text{Eq (6)}$$

where angle $\phi$ may be expressed as:

$$\phi = \frac{1}{2}\tan^{-1}\left(\frac{2B}{D-A}\right). \quad \text{Eq (7)}$$

A 2×2 unitary matrix $V_{2\times2}$ of eigenvectors of $\underline{R}_{2\times2}$ may be derived as:

$$\underline{V}_{2\times2} = \begin{bmatrix} 1 & 0 \\ 0 & e^{-j\theta_b} \end{bmatrix} \cdot \begin{bmatrix} \cos\phi & \sin\phi \\ -\sin\phi & \cos\phi \end{bmatrix} \quad \text{Eq (8)}$$

$$= \begin{bmatrix} \cos\phi & \sin\phi \\ -e^{-j\theta_b} \cdot \sin\phi & e^{-j\theta_b} \cdot \cos\phi \end{bmatrix}.$$

The two eigenvalues $\lambda_1$ and $\lambda_2$ may be computed directly from the elements of $\underline{R}_{re}$, as follows:

$$\lambda_{1,2} = \frac{1}{2}(A+D) \pm B \cdot \sqrt{1 + \left(\frac{D-A}{2B}\right)^2}. \quad \text{Eq (9)}$$

Equation (9) is the solution to a characteristic equation of $\underline{R}_{2\times2}$. In equation (9), $\lambda_1$ is obtained with the plus sign for the second quantity on the right hand side, and $\lambda_2$ is obtained with the minus sign for the second quantity, where $\lambda_1 \geq \lambda_2$.

The elements of $V_{2\times2}$ may be computed directly from the elements of $\underline{R}_{2\times2}$, as follows:

$$r = \sqrt{(\text{Re}\{r_{1,2}\})^2 + (\text{Im}\{r_{1,2}\})^2}, \quad \text{Eq (10a)}$$

$$c_1 = \frac{\text{Re}\{r_{1,2}\}}{r} = \cos(\angle r_{1,2}), \quad \text{Eq (10b)}$$

$$s_1 = \frac{\text{Im}\{r_{1,2}\}}{r} = \sin(\angle r_{1,2}), \quad \text{Eq (10c)}$$

$$g_1 = c_1 - js_1, \quad \text{Eq (10d)}$$

$$\tau = \frac{r_{2,2} - r_{1,1}}{2 \cdot r}, \quad \text{Eq (10e)}$$

$$x = \sqrt{1 + \tau^2}, \quad \text{Eq (10f)}$$

$$t = \frac{1}{|\tau| + x}, \quad \text{Eq (10g)}$$

$$c = \frac{1}{\sqrt{1 + t^2}}, \quad \text{Eq (10h)}$$

$$s = t \cdot c = \sqrt{1 - c^2}, \text{ if} \quad \text{Eq (10i)}$$

$(r_{2,2} - r_{1,1}) < 0$, then $$\underline{V}_{2\times2} = \begin{bmatrix} v_{1,1} & v_{1,2} \\ v_{2,1} & v_{2,2} \end{bmatrix} = \begin{bmatrix} c & -s \\ g_1 \cdot s & g_1 \cdot c \end{bmatrix}, \text{ else} \quad \text{Eq (10j)}$$

$$\underline{V}_{2\times2} = \begin{bmatrix} v_{1,1} & v_{1,2} \\ v_{2,1} & v_{2,2} \end{bmatrix} = \begin{bmatrix} s & c \\ g_1 \cdot c & -g_1 \cdot s \end{bmatrix}, \quad \text{Eq (10k)}$$

where $r_{1,1}$, $r_{1,2}$ and $r_{2,1}$ are elements of $\underline{R}_{2\times2}$, r is the magnitude of $r_{1,2}$, and $\angle r_{1,2}$ is the phase of $r_{1,2}$, which is also denoted as $\theta = \angle r_{1,2}$.

Equation set (10) performs a complex Jacobi rotation on the 2×2 Hermitian matrix $\underline{R}_{2\times2}$ to obtain the matrix $V_{2\times2}$ of eigenvectors of $\underline{R}_{2\times2}$. The computations in equation set (10) are derived to eliminate the arc-tangent operation in equation (7) and the cosine and sine operations in equation (8). However, the square root and division operations in equation set (10) present their own implementation difficulties, so a simpler implementation is desirable. Equation set (10) is computed once for eigenvalue decomposition of the 2×2 Hermitian matrix $\underline{R}_{2\times2}$. A complex matrix larger than 2×2 may be decomposed by performing eigenvalue decomposition of many 2×2 submatrices, as described below. Thus, it is highly desirable to compute equation set (10) as efficiently as possible in order to reduce the amount of time needed to decompose the larger complex matrix.

FIG. 1 shows a block diagram of an embodiment of a processing unit 100 capable of efficiently computing equation set (10) for eigenvalue decomposition of the 2×2 Hermitian matrix $\underline{R}_{2\times2}$. Processing unit 100 includes a CORDIC processor 110, a look-up processor 120, and a post-processor 130. Processing unit 100 receives elements $r_{1,1}, r_{1,2}$ and $r_{2,1}$ of matrix $\underline{R}_{2\times2}$ and provides elements $v_{1,1}, v_{1,2}, v_{2,1}$, and $v_{2,2}$ of matrix $\underline{V}_{2\times2}$. Within processing unit 100, CORDIC processor 110 receives element $r_{1,2}$ of $\underline{R}_{2\times2}$ and computes the magnitude r, phase θ, cosine $c_1$, and sine $s_1$ of element $r_{1,2}$. Look-up processor 120 receives elements $r_{1,1}$ and $r_{2,2}$ of $\underline{R}_{2\times2}$ and the magnitude r of element $r_{1,2}$ from CORDIC processor 110 and computes variables c and s. Post-processor 130 receives elements $r_{1,1}$ and $r_{2,2}$, variables $c_1$ and $s_1$ from CORDIC processor 110, and variables c and s from look-up processor 120 and computes elements $v_{1,1}, v_{1,2}, v_{2,1}$ and $v_{2,2}$ of matrix $\underline{V}_{2\times2}$.

1. CORDIC Processor

Variables r, $c_1$, $s_1$ and hence $g_1$ in equation set (10) may be efficiently computed using CORDIC processor 110. A CORDIC processor implements an iterative algorithm that allows for fast hardware calculation of trigonometric functions such as sine, cosine, magnitude, and phase using simple shift and add/subtract hardware. Variables r, $c_1$ and $s_1$ may be computed in parallel to reduce the amount of time needed to perform eigenvalue decomposition. The CORDIC processor computes each variable iteratively, with more iterations producing higher accuracy for the variable.

A complex multiply of two complex numbers, $R=R_{re}+jR_{im}$ and $C=C_{re}+jC_{im}$, may be expressed as:

$$Y = R \cdot C,$$

$$= (R_{re} + jR_{im}) \cdot (C_{re} + jC_{im}),$$

$$= (R_{re} \cdot C_{re} - R_{im} \cdot C_{im}) + j(R_{re} \cdot C_{im} + R_{im} \cdot C_{re}),$$

Eq (11)

where $Y=Y_{re}+jY_{im}$, $$Y_{re}=R_{re} \cdot C_{re}-R_{im} \cdot C_{im}, \text{ and}$$

Eq (12a)

$$Y_{im}=R_{re} \cdot C_{im}+R_{im} \cdot C_{re}.$$

Eq (12b)

The magnitude of Y is equal to the product of the magnitudes of R and C. The phase of Y is equal to the sum of the phases of R and C.

The complex number R may be rotated by up to 90 degrees by multiplying R with a complex number $C_i$ having the following form: $C_i=1\pm jK_i$, where $C_{i,re}=1$ and $C_{i,im}=\pm K_i$. $K_i$ is decreasing powers of two and has the following form:

$$K_i = 2^{-i},$$

Eq (13)

where i is an index that is defined as i=0, 1, 2, ....

The complex number R may be rotated counter-clockwise if the complex number $C_i$ has the form $C_i=1+jK_i$. The phase of $C_i$ is then $\angle C_i$=arctan $(K_i)$. Equation set (12) may then be expressed as:

$$Y_{re}=R_{re}-K_i \cdot R_{im}=R_{re}-2^{-i} \cdot R_{im}, \text{ and}$$

Eq (14a)

$$Y_{im}=R_{im}+K_i \cdot R_{re}=R_{im}+2^{-i} \cdot R_{re}.$$

Eq (14b)

The complex number R may be rotated clockwise if the complex number $C_i$ has the form $C_i=1-jK_i$. The phase of $C_i$ is then $\angle C_i$=−arctan $(K_i)$. Equation set (12) may then be expressed as:

$$Y_{re}=R_{re}+K_i \cdot R_{im}=R_{re}+2^{-i} \cdot R_{im}, \text{ and}$$

Eq (15a)

$$Y_{im}=R_{im}-K \cdot R_{re}=R_{im}-2^{-i} \cdot R_{re},$$

Eq (15b)

The counter-clockwise rotation in equation set (14) and the clockwise rotation in equation set (15) by the complex number $C_i$ may be achieved by shifting both $R_{im}$ and $R_{re}$ by i bit positions, adding/subtracting the shifted $R_{im}$ to/from $R_{re}$ to obtain $Y_{re}$, and adding/subtracting the shifted $R_{re}$ to/from $R_{im}$ to obtain $Y_{im}$. No multiplies are needed to perform the rotation.

Table 2 shows the value of $K_i$, the complex number $C_i$, the phase of $C_i$, the magnitude of $C_i$, and the CORDIC gain $g_i$ for each value of i from 0 through 7. As shown in Table 2, for each value of i, the phase of $C_i$ is slightly more than half the phase of $C_{i-1}$. A given target phase may be obtained by performing a binary search and either adding or subtracting each successively smaller phase value $\theta_i$. Index i denotes the number of iterations for the binary search, and more iterations give a more accurate final result.

TABLE 2

| i | $K_i = 2^{-i}$ | $C_i = 1 + jK_i$ | Phase of $C_i$, $\theta_i$ = arctan $(K_i)$ | Magnitude of $C_i$ | CORDIC Gain, $g_i$ |
|---|---|---|---|---|---|
| 0 | 1.0 | 1 + j1.0 | 45.00000 | 1.41421356 | 1.414213562 |
| 1 | 0.5 | 1 + j0.5 | 26.56505 | 1.11803399 | 1.581138830 |
| 2 | 0.25 | 1 + j0.25 | 14.03624 | 1.03077641 | 1.629800601 |
| 3 | 0.125 | 1 + j0.125 | 7.12502 | 1.00778222 | 1.642484066 |
| 4 | 0.0625 | 1 + j0.0625 | 3.57633 | 1.00195122 | 1.645688916 |
| 5 | 0.03125 | 1 + j0.03125 | 1.78991 | 1.00048816 | 1.646492279 |
| 6 | 0.015625 | 1 + j0.015625 | 0.89517 | 1.00012206 | 1.646693254 |
| 7 | 0.007813 | 1 + j0.007813 | 0.44761 | 1.00003052 | 1.646743507 |
| ... | ... | ... | ... | ... | ... |

Since the magnitude of $C_i$ is greater than 1.0 for each value of i, multiplication of R with $C_i$ results in the magnitude of R being scaled by the magnitude of $C_i$. The CORDIC gain for a given value of i is the cumulative magnitude of $C_i$ for the current and prior values of i. The CORDIC gain for i is obtained by multiplying the CORDIC gain for i−1 with the magnitude of $C_i$, or $g_i=g_{i-1} \cdot |C_i|$. The CORDIC gain is dependent on the value of i but converges to a value of approximately 1.647 as i approaches infinity.

In equation set (10), r is the magnitude of element $r_{1,2}$ and θ is the phase of element $r_{1,2}$. The magnitude and phase of $r_{1,2}$ may be determined by CORDIC processor 110 as follows. A variable $\tilde{r}_{1,2}$ is formed with the absolute values of the real and imaginary parts of $r_{1,2}$ or $\tilde{r}_{1,2}$=abs (Re $\{r_{1,2}\}$)+j abs (Im $\{r_{1,2}\}$). Thus, $\tilde{r}_{1,2}$ sits on the first quadrant of an x-y plane. The phase θ is initialized to zero. $\tilde{r}_{1,2}$ is then iteratively rotated such that its phase approaches zero.

For each iteration starting with i=0, $\tilde{r}_{1,2}$ is deemed to have (1) a positive phase if the imaginary part of $\tilde{r}_{1,2}$ is positive or (2) a negative phase if the imaginary part of $\tilde{r}_{1,2}$ is negative. If the phase of $\tilde{r}_{1,2}$ is negative, then $\tilde{r}_{1,2}$ is rotated counter-clockwise by $\theta_i$ (or equivalently, $\theta_i$ is added to the phase of $\tilde{r}_{1,2}$) by multiplying $\tilde{r}_{1,2}$ with $C_i=1+jK_i$, as shown in equation set (14). Conversely, if the phase of $\tilde{r}_{1,2}$ is positive, then $\tilde{r}_{1,2}$ is rotated clockwise by $\theta_i$ (or equivalently, $\theta_i$ is subtracted from the phase of $\tilde{r}_{1,2}$) by multiplying $\tilde{r}_{1,2}$ with $C_i=1-jK_i$, as shown in equation set (15). $\tilde{r}_{1,2}$ is thus updated in each iteration by either a counter-clockwise or clockwise rotation. The phase θ is updated by (1) adding $\theta_i$ to the current value of $\theta$ if $\theta_i$ was added to the phase of $\tilde{r}_{1,2}$ or (2) subtracting $\theta_i$ from the current value of $\theta$ if $\theta_i$ was subtracted from the phase of $\tilde{r}_{1,2}$. $\theta$ thus represents the cumulative phase that has been added to or subtracted from the phase of $\tilde{r}_{1,2}$ to zero out the phase.

The final result becomes more accurate as more iterations are performed. Ten iterations are typically sufficient for many applications. After all of the iterations are completed, the phase of $\tilde{r}_{1,2}$ should be close to zero, the imaginary part of $\tilde{r}_{1,2}$ should be approximately zero, and the real part of $\tilde{r}_{1,2}$ is equal to the magnitude of $r_{1,2}$ scaled by the CORDIC gain, or $r = \text{Re}\{\tilde{r}_{1,2}\}/g_i$. The final value of $\theta$ is the total phase rotation to zero out the phase of $\tilde{r}_{1,2}$. The phase of $\tilde{r}_{1,2}$ is thus equal to $-\theta$. The phase $\theta$ may be represented by a sequence of sign bits, $z_1 z_2 z_3 \ldots$, where $z_i = 1$ if $\theta_i$ was subtracted from $\theta$ and $z_i = -1$ if $\theta_i$ was added to $\theta$.

The computation of the magnitude and phase of $r_{1,2}$ may performed as follows. First the variables are initialized as:

$$i=0, \quad \text{Eq (16a)}$$

$$x_0 = \text{abs}(Re\{r_{1,2}\}), \quad \text{Eq (16b)}$$

$$y_0 = \text{abs}(Im\{r_{1,2}\}), \text{ and} \quad \text{Eq (16c)}$$

$$\theta_{tot}(i) = 0. \quad \text{Eq (16d)}$$

A single iteration of the CORDIC computation may be expressed as:

$$z_i = \text{sign}(y_i) = \begin{cases} 1 & \text{if } y_i \geq 0 \\ -1 & \text{if } y_i < 0 \end{cases} \quad \text{Eq (17a)}$$

$$x_{i+1} = x_i + z_i \cdot 2^{-i} \cdot y_i, \quad \text{Eq (17b)}$$

$$y_{i+1} = y_i - z_i \cdot 2^{-i} \cdot x_i, \quad \text{Eq (17c)}$$

$$\theta_i = \arctan(2^{-i}), \quad \text{Eq (17d)}$$

$$\theta_{tot}(i+1) = \theta_{tot}(i) - z_i \cdot \theta_i, \text{ and} \quad \text{Eq (17e)}$$

$$i = i + 1. \quad \text{Eq (17f)}$$

In equations (17b) and (17c), a counter-clockwise rotation is performed if the phase of $x_i + jy_i$ is positive and $z_i = 1$, and a clockwise rotation is performed if the phase of $x_i + jy_i$ is negative and $z_i = -1$. After all of the iterations are completed, the magnitude is set as $r = x_{i+1}$ and the phase is set as $\theta = \theta_{tot}(i+1)$. The scaling by the CORDIC gain may be accounted for by other processing blocks.

In equation set (10), $c_1$ is the cosine of $r_{1,2}$ and $s_1$ is the sine of $r_{1,2}$. The cosine and sine of $r_{1,2}$ may be determined by CORDIC processor 110 as follows. A unit magnitude complex number R' is initialized as $R' = x'_0 + jy'_0 = 1 + j0$ and is then rotated by $-\theta$. For each iteration starting with $i=0$, the complex number R' is rotated (1) counter-clockwise by $\theta_i$ by multiplying R' with $C_i = 1 + jK_i$ if sign bit $z_i$ indicates that $\theta_i$ was subtracted from $\theta$ or (2) clockwise by $\theta_i$ by multiplying R' with $C_i = 1 - jK_i$ if sign bit $z_i$ indicates that $\theta_i$ was added to $\theta$. After all of the iterations are completed, $c_1$ is equal to the real part of the final R' scaled by the CORDIC gain, or $c_1 = x'_i / g_i$, and $s_1$ is equal to the imaginary part of the final R' scaled by the CORDIC gain, or $s_1 = y'_i / g_i$.

The computation of the cosine and sine of $r_{1,2}$ may be performed as follows. First the variables are initialized as:

$$i=0, \quad \text{Eq (18a)}$$

$$x'_0 = 1, \text{ and} \quad \text{Eq (18b)}$$

$$y'_0 = 0. \quad \text{Eq (18c)}$$

A single iteration of the CORDIC computation may be expressed as:

$$x'_{i+1} = x'_i - z_i \cdot 2^{-i} \cdot y'_i, \quad \text{Eq (19a)}$$

$$y'_{i+1} = y'_i + z_i \cdot 2^{-i} \cdot x'_i, \text{ and} \quad \text{Eq (19b)}$$

$$i = i + 1. \quad \text{Eq (19c)}$$

In equations (19a) and (19b), for each iteration i, R' is rotated in the direction indicated by sign bit $z_i$. After all of the iterations are completed, the cosine is set as $c_i = x'_{i+1}$ and the sine is set as $s_1 = y'_{i+1}$. The scaling by the CORDIC gain may be accounted for by other processing blocks.

The cosine $c_1$ and the sine $s_1$ may also be computed in parallel with the magnitude r by initializing the variable R' to a CORDIC gain scaled version of $1 + j0$, or $R' = (1 + j0)/g$ where g is the CORDIC gain for the number of iterations to be performed. At each iteration, the CORDIC rotation performed for the magnitude r is determined, and an opposite CORDIC rotation is performed on the variable R'. For this scheme, it is not necessary to determine the phase $\theta$.

Figure 2:
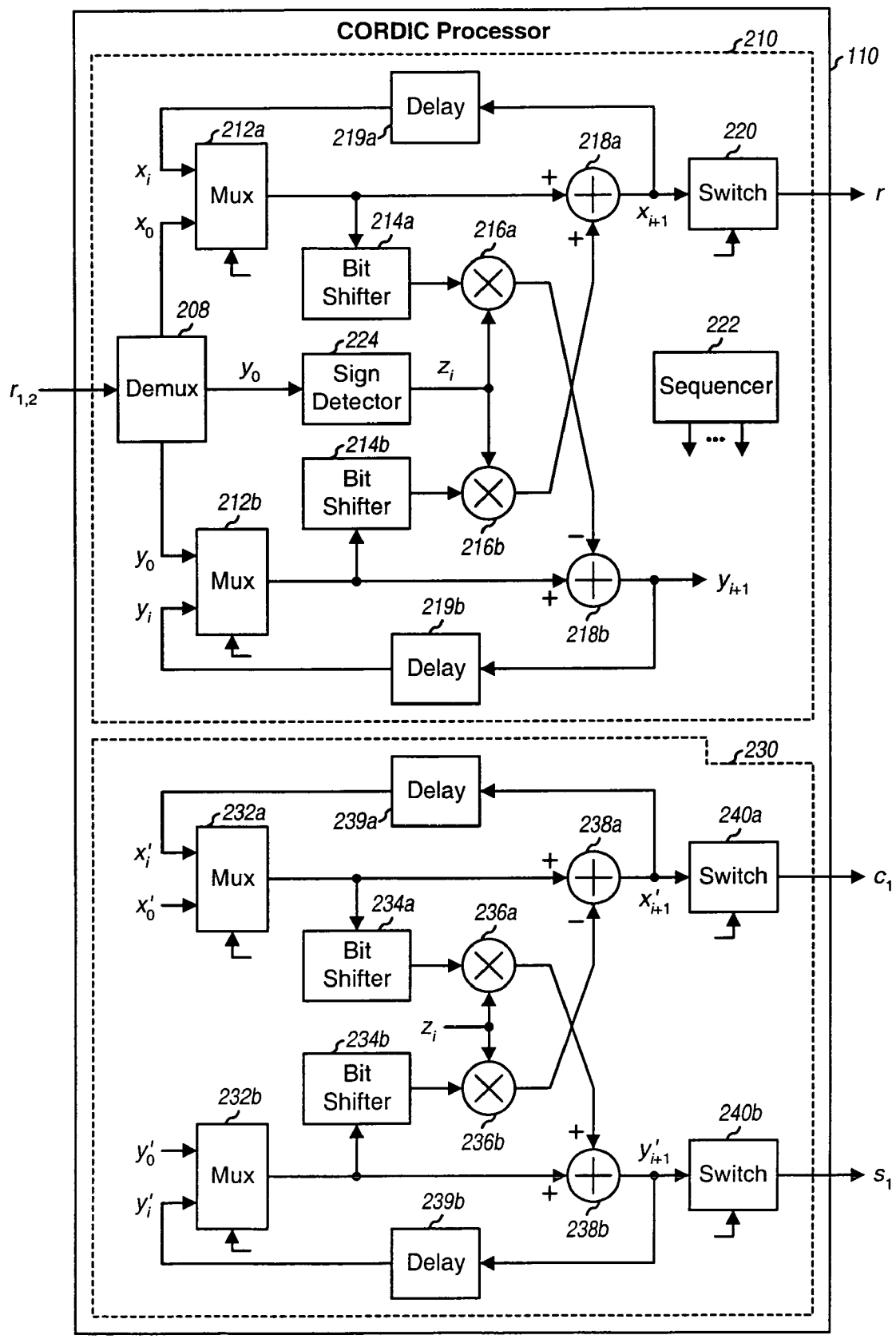
FIG. 2 shows a CORDIC processor within the processing unit in FIG. 1.

FIG. 2 shows a block diagram of CORDIC processor 110 for computing variables r, $c_1$, and $s_1$ in equation set (10). CORDIC processor 110 includes a CORDIC unit 210 that computes the magnitude and phase of element $r_{1,2}$ and a CORDIC unit 230 that computes the cosine and sine of element $r_{1,2}$. CORDIC units 210 and 230 may be operated in parallel.

Within CORDIC unit 210, a demultiplexer (Demux) 208 receives element $r_{1,2}$, provides abs (Re $\{r_{1,2}\}$) as $x_0$, and provides abs (Im $\{r_{1,2}\}$) as $y_0$. A multiplexer (Mux) 212a receives $x_0$ on a first input and $x_i$ from a delay element 219a on a second input, provides $x_0$ on its output when $i=0$, and provides $x_i$ on its output when $i>0$. The output of multiplexer 212a is $x_i$ for the current iteration. A shifter 214a receives and shifts $x_i$ to the left by i bits and provides a shifted $x_i$. A multiplexer 212b receives $y_0$ on a first input and $y_i$ from a delay element 219b on a second input, provides $y_0$ on its output when $i=0$, and provides $y_i$ on its output when $i>0$. The output of multiplexer 212b is $y_i$ for the current iteration. A shifter 214b receives and shifts $y_i$ to the left by i bits and provides a shifted $y_i$. A sequencer 222 steps through index i and provides appropriate controls for the units within CORDIC processor 110. A sign detector 224 detects the sign of $y_i$ and provides sign bit $z_i$, as shown in equation (17a).

A multiplier 216a multiplies the shifted $x_i$ with sign bit $z_i$. A multiplier 216b multiplies the shifted $y_i$ with sign bit $z_i$. Multipliers 216a and 216b may be implemented with bit inverters. A summer 218a sums the output of multiplier 216b with $x_i$ and provides $x_{i+1}$ for the current iteration (which is also $x_i$ for the next iteration) to delay element 219a and a switch 220. A summer 218b subtracts the output of multiplier 216a from $y_i$ and provides $y_{i+1}$ for the current iteration (which is also $y_i$ for the next iteration) to delay element 219b. Switch 220 provides $x_{i+1}$ as the magnitude r after all of the iterations are completed.

Within CORDIC unit 230, a multiplexer 232a receives $x'_0 = 1$ on a first input and $x'_i$ from a delay element 239a on a second input, provides $x'_0$ on its output when $i=0$, and provides $x'_i$ on its output when i>0. The output of multiplexer 232a is $x'_i$ for the current iteration. A shifter 234a receives and shifts $x'_i$ to the left by i bits and provides a shifted $x'_i$. A multiplexer 232b receives $y'_0=0$ on a first input and $y'_i$ from a delay element 239b on a second input, provides $y'_0$ on its output when i=0, and provides $y'_i$ on its output when i>0. The output of multiplexer 232b is $y'_i$ for the current iteration. A shifter 234b receives and shifts $y'_i$ to the left by i bits and provides a shifted $y'_i$.

A multiplier 236a multiplies the shifted $x'_i$ with sign bit $z_i$ from detector 224. A multiplier 236b multiplies the shifted $y'_i$ with sign bit $z_i$. Multipliers 236a and 236b may also be implemented with bit inverters. A summer 238a subtracts the output of multiplier 236b from $x'_i$ and provides $x'_{i+1}$ for the current iteration (which is also $x'_i$ for the next iteration) to delay element 239a and a switch 240a. A summer 238b adds the output of multiplier 236a with $y'_i$ and provides $y^{i+1}$ for the current iteration (which is also $y'_i$ for the next iteration) to delay element 239b and a switch 240b. After all of the iterations are completed, switch 240a provides $x'_{i+1}$ as cosine $c_1$, and switch 240b provides $y'_{i+1}$ as sine $s_1$.

2. Look-Up Table

In equation set (10), variables c and s are functions of only τ, and intermediate variables x and t are used to simplify the notation. abs (τ) ranges from 0 to ∞, variable c ranges from 0.707 to 1.0, and variable s ranges from 0.707 to 0.0. A large range of values for τ is thus mapped to a small range of values for c and also a small range of values for s. Hence, an approximate value of τ should give good approximations of both c and s.

A look-up table (LUT) may be used to efficiently compute variables c and s based on the dividend/numerator and the divisor/denominator for τ. The use of the look-up table avoids the need to perform a division to compute τ in equation (10e), a square root to compute x in equation (10f), a division to compute t in equation (10g), a division and a square root to compute c in equation (10h), and a multiply to compute s in equation (10i). Since division and square root operations are computationally intensive, the use of the look-up table can greatly reduce the amount of time needed to perform eigenvalue decomposition. The computation of variables c and s using the look-up table may be performed as follows.

The dividend is equal to $r_{2,2}-r_{1,1}$, and the absolute value of the dividend is represented as a binary floating-point number of the form $1.b_{n_1}b_{n_2}b_{n_3}\ldots \times 2^{m_n}$, where $b_{n_i}$ represents a single bit of the mantissa for the dividend and $m_n$ is the exponent for the dividend. The binary floating-point number for the dividend may be obtained by left shifting the dividend one bit at a time until the most significant bit (MSB) is a one ('1'), and setting $m_n$ equal to the number of left bit shifts.

The divisor is equal to 2·r and is a positive value because r is the magnitude of $r_{1,2}$. The divisor is also represented as a binary floating-point number of the form $1.b_{d_1}b_{d_2}b_{d_3}\ldots \times 2^{m_d}$, where $b_{d_i}$ represents a single bit of the mantissa for the divisor and $m_d$ is the exponent for the divisor. The binary floating-point number for the divisor may be obtained by left shifting the divisor one bit at a time until the MSB is a one ('1'), and setting $m_d$ equal to the number of left bit shifts.

The fractional bits of the mantissa for the dividend (which are $b_{n_1}, b_{n_2}, b_{n_3}, \ldots$) the fractional bits of the mantissa for the divisor (which are $b_{d_1}, b_{d_2}, b_{d_3}, \ldots$), and the difference in the exponents for the dividend and the divisor (which is $\Delta m = m_d - m_n$) are intermediate quantities that are used as an input address for the look-up table. The look-up table returns stored values for variables c and s based on the input address.

In general, the look-up table may be of any size. A larger size look-up table can provide greater accuracy in the computation of variables c and s. In a specific embodiment, the look-up table has a size of 2K×16, an 11-bit input address, an 8-bit output for variable c, and a 8-bit output for variable s. The 11-bit input address is composed of three fractional bits $b_{n_1}, b_{n_2}$, and $b_{n_3}$ for the dividend, three factional bits $b_{d_1}, b_{d_2}$, and $b_{d_3}$ for the divisor, and five bits for the exponent difference Δm. The range of values for the 5-bit exponent difference was determined by computer simulation. The minimum observed exponent difference was −17 and the maximum observed exponent difference was +14. Since variables c and s are positive values, it is not necessary to store the sign bit for each of these variables in the look-up table. Furthermore, since variable c is always greater than 0.707, the leftmost fractional bit is always equal to '1' and does not need to be stored in the look-up table. The look-up table thus stores the next eight leftmost fractional bits for variable c (i.e., excluding the leftmost fractional bit) and the eight leftmost fractional bits for variable s. A 10-bit signed value for variable c can thus be obtained with an 8-bit unsigned value provided by the look-up table for c. A 9-bit signed value for variable s can be obtained with an 8-bit unsigned value provided by the look-up table for s.

Figure 3:
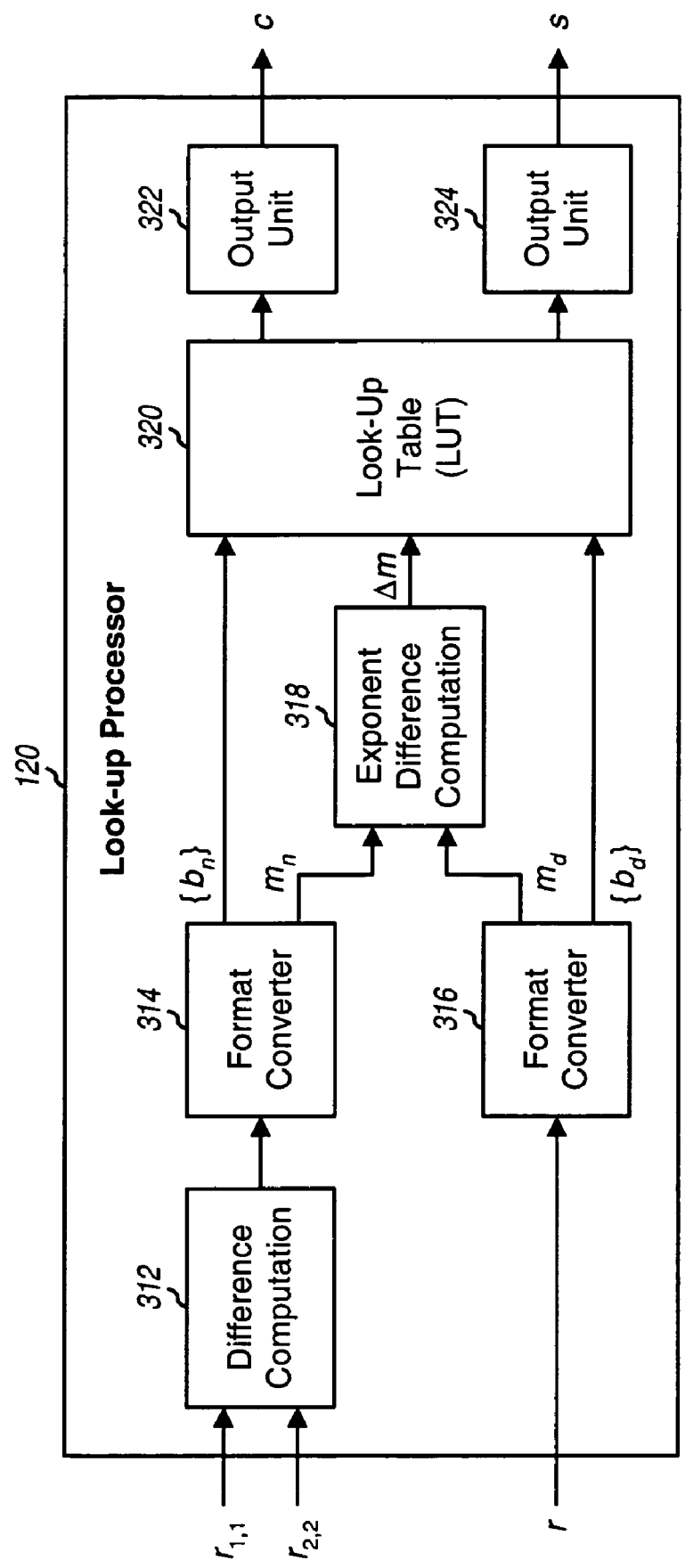
FIG. 3 shows a look-up processor within the processing unit in FIG. 1.

FIG. 3 shows a block diagram of look-up processor 120 for computing variables c and s in equation set (10). Within look-up processor 120, a difference computation unit 312 receives elements $r_{1,1}$ and $r_{2,2}$ of matrix $\underline{R}_{2\times2}$, computes the difference between these elements as $r_{2,2}-r_{1,1}$, and provides the difference as the dividend for z. A format converter 314 converts the dividend into a binary floating-point number $1.b_{n_1}b_{n_2}b_{n_3}\ldots \times 2^{m_n}$, provides the fractional bits $\{b_n\}$ of the mantissa to a look-up table 320, and provides the exponent $m_n$ to an exponent difference computation unit 318. A format converter 316 receives variable r as the divisor, converts the divisor into a binary floating-point number $1.b_{d_1}b_{d_2}b_{d_3}\ldots \times 2^{m_d}$, provides the fractional bits $\{b_d\}$ of the mantissa to look-up table 320, and provides the exponent $m_d$ to unit 318. Unit 318 computes the difference of the exponents for the dividend and the divisor as $\Delta m = m_d - m_n$ and provides the exponent difference Δm to look-up table 320. Units 312, 314, 316, and 318 form a pre-processor that generates the intermediate quantities for look-up table 320.

Look-up table 320 receives the fractional bits $\{b_n\}$ for the dividend, the fractional bits $\{b_d\}$ for the divisor, and the exponent difference Δm as an input address. Look-up table 320 provides the stored values for variables c and s based on the input address. An output unit 322 appends a '1' for the leftmost fractional bit for variable c, further appends a plus sign bit ('+'), and provides the final value of c. An output unit 324 appends a plus sign bit ('+') for variable s and provides the final value of s.

Look-up table 320 may be designed to account for the CORDIC gain in the computation of r, $c_1$, and $s_1$ so that the elements of $V_{2\times2}$ have the proper magnitude. For example, since the magnitude r is used to form the address for look-up table 320, the CORDIC gain for the magnitude r may be accounted for in the addressing of the look-up table. In another embodiment, look-up table 320 stores a rotation sequence for a CORDIC processor, which then computes variables c and s with the rotation sequence. The rotation sequence is the sequence of sign bits $z_i$ and may be stored using fewer bits than the actual values for variables c and s. However, the CORDIC processor would require some amount of time to compute variables c and s based on the rotation sequence.

Figure 4:
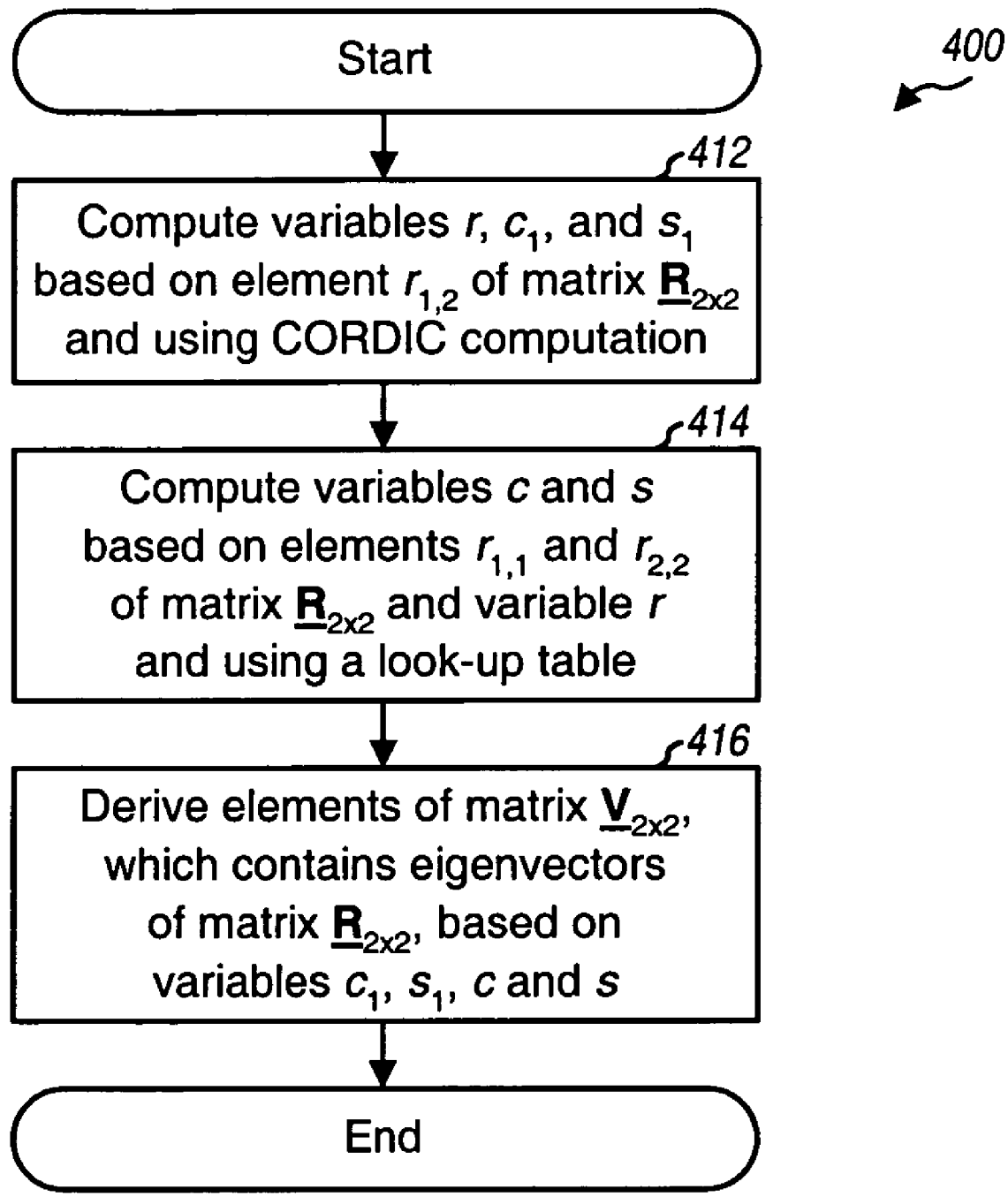
FIG. 4 shows a process for efficiently performing eigenvalue decomposition of the 2×2 Hermitian matrix.

FIG. 4 shows a process 400 for efficiently performing eigenvalue decomposition of the 2×2 Hermitian matrix $\underline{R}_{2\times2}$. Variables r, $c_1$, and $s_1$ are computed based on element $r_{1,2}$ of $R_{2\times2}$ and using CORDIC computation (block 412). Variables c and s are computed based on elements $r_{1,1}$ and $r_{2,2}$ of $R_{2\times2}$ and variable r and using a look-up table (block 414). The computation in block 412 may be performed in parallel with the computation in block 414 by different hardware units to speed up the eigenvalue decomposition. The four elements of matrix $V_{2\times2}$, which contains the eigenvectors of $R_{2\times2}$, are then derived based on variables $c_1$, $s_1$, c and s, as shown in equation (10j) or (10k) (block 416).

In the description above, the variables r, $c_1$ and $s_1$ are derived with a CORDIC processor and the variables c and s are derived with a look-up table. The variables r, $c_1$ and $s_1$ may also be derived with one or more look-up tables of sufficient size to obtain the desired accuracy for r, $c_1$ and $s_1$. The variables r, $c_1$ and $s_1$ and the variables c and s may also be computed in other manners and/or using other algorithms (e.g., power series). The choice of which method and algorithm to compute each set of variables may be dependent on various factors such as the available hardware, the amount of time available for computation, and so on.

3. Eigenvalue Decomposition

Eigenvalue decomposition of an N×N Hermitian matrix that is larger than 2×2, as shown in equation (2), may be performed with an iterative process. This iterative process uses the Jacobi rotation repeatedly to zero out off-diagonal elements in the N×N Hermitian matrix. For the iterative process, N×N unitary transformation matrices are formed based on 2×2 Hermitian sub-matrices of the N×N Hermitian matrix and are repeatedly applied to diagonalize the N×N Hermitian matrix. Each N×N unitary transformation matrix contains four non-trivial elements (elements other than 0 or 1) that are derived from elements of a corresponding 2×2 Hermitian sub-matrix. The resulting diagonal matrix contains the real eigenvalues of the N×N Hermitian matrix, and the product of all of the unitary transformation matrices is an N×N matrix of eigenvectors for the N×N Hermitian matrix.

In the following description, index i denotes the iteration number and is initialized as i=0. $R$ is an N×N Hermitian matrix to be decomposed, where N>2. An N×N matrix $D_i$ is an approximation of diagonal matrix $\Lambda$ of eigenvalues of $R$ and is initialized as $R_0 = R$. An N×N matrix $V_i$ is an approximation of matrix V of eigenvectors of $R$ and is initialized as $V_0 = I$.

A single iteration of the Jacobi rotation to update matrices $D_i$ and $V_i$ may be performed as follows. First, a 2×2 Hermitian matrix $D_{pq}$ is formed based on the current $D_i$ as follows:

$$D_{pq} = \begin{bmatrix} d_{p,p} & d_{p,q} \\ d_{q,p} & d_{q,q} \end{bmatrix}, \quad \text{Eq (20)}$$

where $d_{p,q}$ is the element at location (p, q) in $D_i$; and
$p \in \{1, \ldots, N\}$, $q \in \{1, \ldots, N\}$, and $p \neq q$.

$D_{pq}$ is a 2×2 submatrix of $D_i$, and the four elements of $D_{pq}$ are four elements at locations (p, p), (p, q), (q, p) and (q, q) in $D_i$. The values for indices p and q may be selected in a predetermined or deterministic manner, as described below.

Eigenvalue decomposition of $D_{pq}$ is then performed as shown in equation set (10) to obtain a 2×2 unitary matrix $V_{pq}$ of eigenvectors of $D_{pq}$. For the eigenvalue decomposition of $D_{pq}$, $R_{2\times2}$ in equation (4) is replaced with $D_{pq}$, and $V_{2\times2}$ from equation (10j) or (10k) is provided as $V_{pq}$.

An N×N complex Jacobi rotation matrix $T_{pq}$ is then formed with matrix $V_{pq}$. $T_{pq}$ is an identity matrix with the four elements at locations (p, p), (p, q), (q, p) and (q, q) replaced with the (1, 1), (1, 2), (2, 1) and (2, 2) elements, respectively, of $V_{pq}$. $T_{pq}$ has the following form:

$$T_{pq} = \begin{bmatrix} 1 & & & & & \\ & \ddots & & & & \\ & & v_{1,1} & \cdots & v_{1,2} & \\ & & \vdots & 1 & \vdots & \\ & & v_{2,1} & \cdots & v_{2,2} & \\ & & & & & \ddots \\ & & & & & & 1 \end{bmatrix}, \quad \text{Eq (21)}$$

where $v_{1,1}$, $v_{1,2}$, $v_{2,1}$ and $v_{2,2}$ are the four elements of $V_{pq}$. All of the other off-diagonal elements of $T_{pq}$ are zeros. Equations (10j) and (10k) indicate that $T_{pq}$ is a complex matrix containing complex values for $v_{2,1}$ and $v_{2,2}$. $T_{pq}$ is also called a transformation matrix that performs the Jacobi rotation.

Matrix $D_i$ is then updated as follows:

$$D_{i+1} = T_{pq}^H \cdot D_i \cdot T_{pq}. \quad \text{Eq (22)}$$

Equation (22) zeros out two off-diagonal elements $d_{p,q}$ and $d_{q,p}$ at locations (p, q) and (q, p), respectively, in $D_i$. The computation may alter the values of other off-diagonal elements in $D_i$.

Matrix $V_i$ is also updated as follows:

$$D_{i+1} = V_i \cdot T_{pq}. \quad \text{Eq (23)}$$

$V_i$ may be viewed as a cumulative transformation matrix that contains all of the Jacobi rotation matrices $T_{pq}$ used on $D_i$.

The Jacobi rotation matrix $T_{pq}$ may also be expressed as a product of (1) a diagonal matrix with N−1 ones elements and one complex-valued element and (2) a real-valued matrix with N−2 ones along the diagonal, two real-valued diagonal elements, two real-valued off-diagonal elements, and zeros elsewhere. As an example, for p=1 and q=2, $T_{pq}$ has the following form:

$$T_{pq} = \begin{bmatrix} c & -s & 0 & \cdots & 0 \\ g_1 s & g_1 c & 0 & \cdots & 0 \\ 0 & 0 & 1 & & \vdots \\ \vdots & \vdots & & \ddots & 0 \\ 0 & 0 & \cdots & 0 & 1 \end{bmatrix} \quad \text{Eq (24)}$$

$$= \begin{bmatrix} 1 & 0 & 0 & \cdots & 0 \\ 0 & g_1 & 0 & \cdots & 0 \\ 0 & 0 & 1 & & \vdots \\ \vdots & \vdots & & \ddots & 0 \\ 0 & 0 & \cdots & 0 & 1 \end{bmatrix} \cdot \begin{bmatrix} c & -s & 0 & \cdots & 0 \\ s & c & 0 & \cdots & 0 \\ 0 & 0 & 1 & & \vdots \\ \vdots & \vdots & & \ddots & 0 \\ 0 & 0 & \cdots & 0 & 1 \end{bmatrix},$$

where $g_1$ is a complex value and c and s are real values. The update of $D_i$ in equation (22) may then be performed with 12(N−2)+8 real multiplies, and the update of $V_i$ in equation (23) may be performed with 12N real multiplies. A total of 24N−16 real multiples are then performed for one iteration. Besides the $T_{pq}$ structure, the number of multiplies to update $D_i$ is reduced by the fact that $D_i$ remains Hermitian after the update and that there is a 2×2 diagonal sub-matrix after the update with real-valued eigenvalues as the diagonal elements.

Each iteration of the Jacobi rotation zeros out two off-diagonal elements of $D_i$. Multiple iterations of the Jacobi rotation may be performed for different values of indices p and q to zero out all of the off-diagonal elements of $D_i$. The indices p and q may be selected in a predetermined manner by sweeping through all possible values.

A single sweep across all possible values for indices p and q may be performed as follows. The index p is stepped from 1 through N−1 in increments of one. For each value of p, the index q is stepped from p+1 through N in increments of one. An iteration of the Jacobi rotation to update $D_i$ and $V_i$ may be performed for each different combination of values for p and q. For each iteration, $D_{pq}$ is formed based on the values of p and q and the current $D_i$ for that iteration, $V_{pq}$ is computed for $D_{pq}$ as shown in equation set (10), $\underline{T}_{pq}$ is formed with $V_{pq}$ as shown in equation (21) or (24), $D_i$ is updated as shown in equation (22), and $V_i$ is updated as shown in equation (23). For a given combination of values for p and q, the Jacobi rotation to update $D_i$ and $V_i$ may also be skipped if the magnitude of the off-diagonal elements at locations (p, q) and (q, p) in $D_i$ are below a predetermined threshold.

A sweep consists of N·(N−1)/2 iterations of the Jacobi rotation to update $D_i$ and $V_i$ for all possible values of p and q. Each iteration of the Jacobi rotation zeros out two off-diagonal elements of $D_i$ but may alter other elements that might have been zeroed out earlier. The effect of sweeping through indices p and q is to reduce the magnitude of all off-diagonal elements of $D_i$, so that $D_i$ approaches the diagonal matrix $\Lambda$. $V_i$ contains an accumulation of all Jacobi rotation matrices that collectively give $D_i$. $V_i$ thus approaches V as $D_i$ approaches $\Lambda$.

Any number of sweeps may be performed to obtain more and more accurate approximations of V and $\Lambda$. Computer simulations have shown that four sweeps should be sufficient to reduce the off-diagonal elements of $D_i$ to a negligible level, and three sweeps should be sufficient for most applications. A predetermined number of sweeps (e.g., three or four sweeps) may be performed. Alternatively, the off-diagonal elements of $D_i$ may be checked after each sweep to determine whether $D_i$ is sufficiently accurate. For example, the total error (e.g., the power in all off-diagonal elements of $D_i$) may be computed after each sweep and compared against an error threshold, and the iterative process may be terminated if the total error is below the error threshold. Other conditions or criteria may also be used to terminate the iterative process.

The values for indices p and q may also be selected in a deterministic manner. As an example, for each iteration i, the largest off-diagonal element of $D_i$ is identified and denoted as $d_{p,q}$. The iteration is then performed with $D_{pq}$ containing this largest off-diagonal element $d_{p,q}$ and three other elements at locations (p, p), (q, p), and (q, q) in $D_i$. The iterative process may be performed until a termination condition is encountered. The termination condition may be, for example, completion of a predetermined number of iterations, satisfaction of the error criterion described above, or some other condition or criterion.

Upon termination of the iterative process, the final $V_i$ is a good approximation of V, and the final $D_i$ is a good approximation of $\Lambda$. The columns of $V_i$ may be used as the eigenvectors of $\underline{R}$, and the diagonal elements of $D_i$ may be used as the eigenvalues of $\underline{R}$. The eigenvalues in the final $D_i$ are ordered from largest to smallest because the eigenvectors in $V_{pq}$ for each iteration are ordered. The eigenvectors in the final $V_i$ are also ordered based on their associated eigenvalues in $D_i$.

Except for the first iteration, the computation of $\underline{T}_{pq}$ and the updates of $D_i$ and $V_i$ do not have to proceed in a sequential order, assuming that the computations do not share the same hardware units. Since the updates of $D_i$ and $V_i$ involve matrix multiplies, it is likely that these updates will proceed in a sequential order using the same hardware. The computation of $\underline{T}_{pq}$ for the next iteration can start as soon as the off-diagonal elements of $D_i$ have been updated for the current iteration. The computation of $\underline{T}_{pq}$ may be performed with dedicated hardware while $V_i$ is updated. If the Jacobi rotation computation is finished by the time the $V_i$ update is done, then the $D_i$ update for the next iteration can start as soon as the $V_i$ update for the current iteration is completed.

Figure 5:
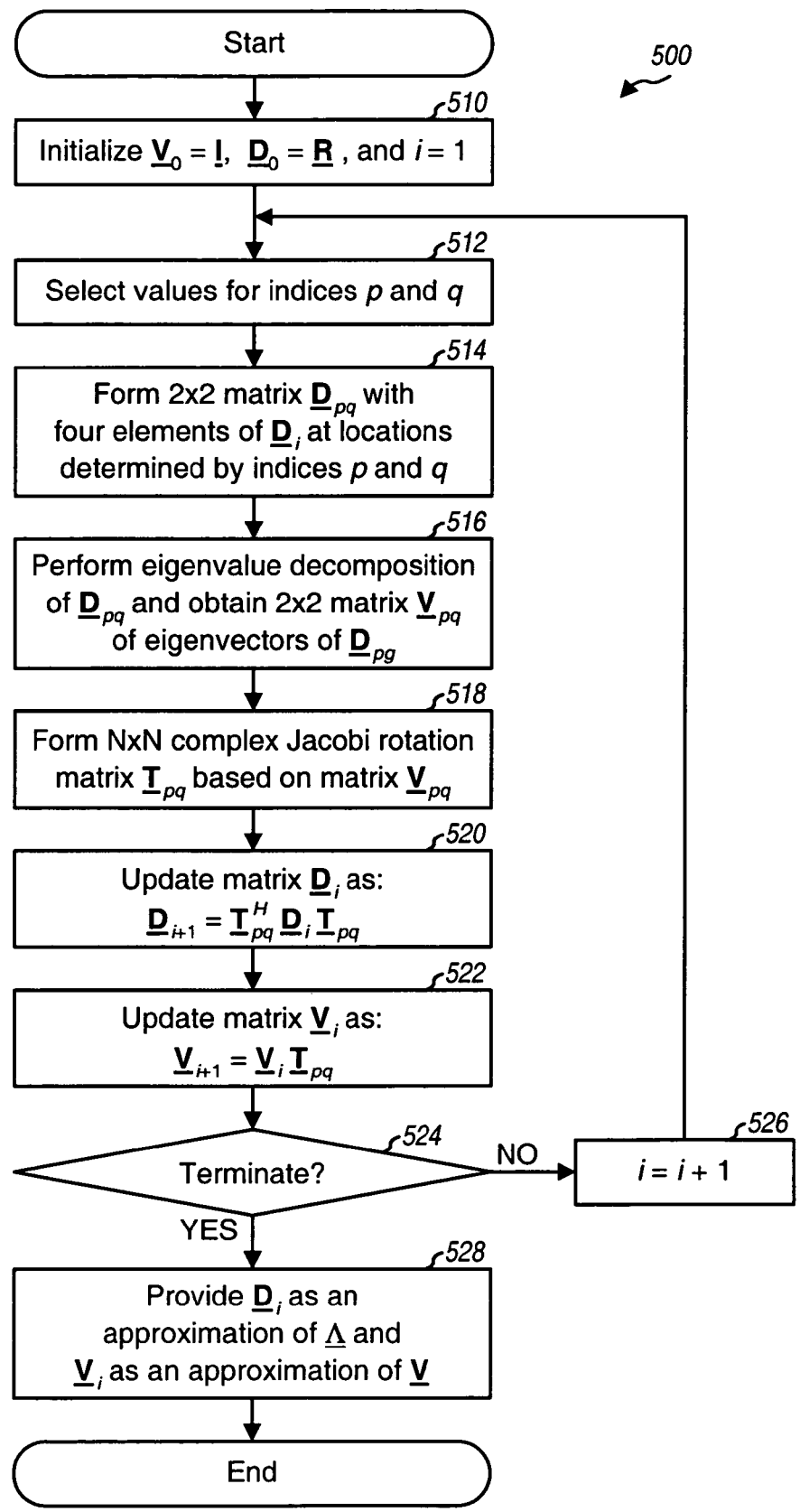
FIG. 5 shows an iterative process for performing eigenvalue decomposition of an N×N Hermitian matrix.

FIG. 5 shows an iterative process 500 for performing eigenvalue decomposition of an N×N Hermitian matrix $\underline{R}$, where N>2. Matrices $V_i$ and $D_i$ are initialized as $V_0$=I and $D_0$= $\underline{R}$, and index i is initialized as i=1 (block 510).

For iteration i, the values for indices p and q are selected in a predetermined manner (e.g., by stepping through all possible values for these indices) or a deterministic manner (e.g., by selecting the index values for the largest off-diagonal element) (block 512). A 2×2 matrix $D_{pq}$ is then formed with four elements of matrix $D_i$ at the locations determined by indices p and q (block 514). Eigenvalue decomposition of $D_{pq}$ is then performed as shown in equation set (10) to obtain a 2×2 matrix $V_{pq}$ of eigenvectors of $D_{pq}$ (block 516). This eigenvalue decomposition may be efficiently performed as described above for FIGS. 1 through 4.

An N×N complex Jacobi rotation matrix $\underline{T}_{pq}$ is then formed based on matrix $V_{pq}$, as shown in equation (21) or (24) (block 518). Matrix $D_i$ is then updated based on $\underline{T}_{pq}$, as shown in equation (22) (block 520). Matrix $V_i$ is also updated based on $\underline{T}_{pq}$, as shown in equation (23) (block 522).

A determination is then made whether to terminate the eigenvalue decomposition of $\underline{R}$ (block 524). The termination criterion may be based on the number of iterations or sweeps already performed, an error criterion, and so on. If the answer is 'No' for block 524, then index i is incremented (block 526), and the process returns to block 512 for the next iteration. Otherwise, if termination is reached, then matrix $D_i$ is provided as an approximation of diagonal matrix $\Lambda$, and matrix $V_i$ is provided as an approximation of matrix V of eigenvectors of $\underline{R}$ (block 528).

For a multi-carrier MIMO system (e.g., a MIMO system that utilizes OFDM), multiple channel response matrices H(k) may be obtained for different subbands. The iterative process may be performed for each channel response matrix H(k) to obtain matrices $D_i(k)$ and $V_i(k)$, which are approximations of diagonal matrix $\Lambda(k)$ and matrix V (k) of eigenvectors, respectively, of $\underline{R}(k)=H^H(k)\cdot H(k)$.

A high degree of correlation typically exists between adjacent subbands in a MIMO channel. This correlation may be exploited by the iterative process to reduce the amount of computation to derive $D_i(k)$ and $V_i(k)$ for all subbands of interest. For example, the iterative process may be performed for one subband at a time, starting from one end of the system bandwidth and traversing toward the other end of the system bandwidth. For each subband k except for the first subband, the final solution $V_i(k-1)$ obtained for the prior subband k−1 may be used as an initial solution for the current subband k. The initialization for each subband k may be given as: $V_0(k)=V_i(k-1)$ and $D_0(k)=V_0^H(k)\cdot\underline{R}(k)\cdot V_0(k)$. The iterative process then operates on the initial solutions of $D_0(k)$ and $V_0(k)$ for subband k until a termination condition is encountered.

The concept described above may also be used across time. For each time interval t, the final solution $V_i(t-1)$ obtained for a prior time interval t−1 may be used as an initial solution for the current time interval t. The initialization for each time interval t may be given as: $V_0(t)=V_i(t-1)$ and $D_0(t)=V_0^H(t)\cdot\underline{R}(t)\cdot V_0(t)$, where $\underline{R}(t)=H^H(t)\cdot H(t)$ and H (t) is the channel response matrix for time interval t. The iterative process then operates on the initial solutions of $D_0(t)$ and $V_0(t)$ for time interval t until a termination condition is encountered.

4. Singular Value Decomposition

The iterative process may also be used for singular value decomposition (SVD) of an arbitrary complex matrix H larger than 2×2. H has a dimension of R×T, where R is the number of rows and T is the number of columns. The iterative process for singular value decomposition of H may be performed in several manners.

In a first SVD embodiment, the iterative process derives approximations of the right singular vectors in V and the scaled left singular vectors in U·Σ. For this embodiment, a T×T matrix $V_i$ is an approximation of V and is initialized as $V_0$=I. An R×T matrix $W_i$ is an approximation of U·Σ and is initialized as $W_0$=H.

For the first SVD embodiment, a single iteration of the Jacobi rotation to update matrices $V_i$ and $W_i$ may be performed as follows. First, a 2×2 Hermitian matrix $M_{pq}$ is formed based on the current $W_i$. $M_{pq}$ is a 2×2 submatrix of $W_i^H \cdot W_i$ and contains four elements at locations (p, p), (p, q), (q, p) and (q, q) in $W_i^H \cdot W_i$. The elements of $M_{pq}$ may be computed as follows:

$$M_{pq} = \begin{bmatrix} m_{1,1} & m_{1,2} \\ m_{1,2}^* & m_{2,2} \end{bmatrix},$$ Eq (25a)

$$m_{1,1} = |\underline{w}_p|^2 = \sum_{l=1}^{R} w_{l,p}^* \cdot w_{l,p},$$ Eq (25b)

$$m_{2,2} = |\underline{w}_q|^2 = \sum_{l=1}^{R} w_{l,q}^* \cdot w_{l,q}, \text{ and}$$ Eq (25c)

$$m_{1,2} = \underline{w}_p^H \cdot \underline{w}_q = \sum_{l=1}^{R} w_{l,p}^* \cdot w_{l,q},$$ Eq (25d)

where $w_p$ is column p of $W_i$, $w_q$ is column q of $W_i$, and $w_{l,p}$ is the element at location (l, p) in $W_i$. Indices p and q are such that p∈{1, . . . , T}, q∈{1, . . . , T}, and p≠q. The values for indices p and q may be selected in a predetermined or deterministic manner, as described above.

Eigenvalue decomposition of $M_{pq}$ is then performed as shown in equation set (10) to obtain a 2×2 unitary matrix $V_{pq}$ of eigenvectors of $M_{pq}$. For this eigenvalue decomposition, $R_{2\times 2}$ is replaced with $M_{pq}$, and $V_{2\times 2}$ is provided as $V_{pq}$.

A T×T complex Jacobi rotation matrix $\underline{T}_{pq}$ is then formed with matrix $V_{pq}$. $\underline{T}_{pq}$ is an identity matrix with the four elements at locations (p, p), (p, q), (q, p) and (q, q) replaced with the (1, 1), (1, 2), (2, 1) and (2, 2) elements, respectively, of $V_{pq}$. $\underline{T}_{pq}$ has the form shown in equations (21) and (24).

Matrix $V_i$ is then updated as follows:

$$V_{i+1} = V_i \cdot \underline{T}_{pq}.$$ Eq (26)

Matrix $W_i$ is also updated as follows:

$$W_{i+1} = W_i \cdot \underline{T}_{pq}.$$ Eq (27)

The iterative process is performed until a termination condition is encountered, which may be a predetermined number of sweeps or iterations, satisfaction of an error criterion, and so on. Upon termination of the iterative process, the final $V_i$ is a good approximation of V, and the final $W_i$ is a good approximation of U·Σ. When converged, $W_i^H \cdot W_i = \Sigma^T \cdot \Sigma$ and $U = W_i \cdot \Sigma^{-1}$, where "T" denotes a transpose. For a square diagonal matrix, the final solution of Σ may be given as: $\hat{\Sigma} = (W_i^H \cdot W_i)_{1/2}$. For a non-square diagonal matrix, the non-zero diagonal values of $\hat{\Sigma}$ are given by the square roots of the diagonal elements of $W_i^H \cdot W_i$. The final solution of U may be given as: $\hat{U} = W_i \cdot \hat{\Sigma}^{-1}$.

The left singular vectors of H may be obtained by performing the first SVD embodiment and solving for scaled left singular vectors H·V = U·Σ and then normalizing. The left singular vectors of H may also be obtained by performing the iterative process for eigenvalue decomposition of $H \cdot H^H$.

In a second SVD embodiment, the iterative process directly derives approximations of the right singular vectors in V and the left singular vectors in U. This SVD embodiment applies the Jacobi rotation on a two-sided basis to simultaneously solve for the left and right singular vectors. For the second SVD embodiment, a T×T matrix $V_i$ is an approximation of V and is initialized as $V_0$=I. An R×R matrix $U_i$ is an approximation of U and is initialized as $U_0$=I. An R×T matrix $D_i$ is an approximation of Σ and is initialized as $D_0$=H.

For the second SVD embodiment, a single iteration of the Jacobi rotation to update matrices $V_i$, $U_i$ and $D_i$ may be performed as follows. First, a 2×2 Hermitian matrix $X_{p_1 q_1}$ is formed based on the current $D_i$. $X_{p_1 q_1}$ is a 2×2 submatrix of $D_i^H \cdot D_i$ and contains four elements at locations ($p_1$, $p_1$), ($p_1$, $q_1$), ($q_1$, $p_1$) and ($q_1$, $q_1$) in $D_i^H \cdot D$. The four elements of $X_{p_1 q_1}$ may be computed as follows:

$$X_{p_1 q_1} = \begin{bmatrix} x_{1,1} & x_{1,2} \\ x_{1,2}^* & x_{2,2} \end{bmatrix},$$ Eq (28a)

$$x_{1,1} = |\underline{d}_{p_1}|^2 = \sum_{l=1}^{R} d_{l,p_1}^* \cdot d_{l,p_1},$$ Eq (28b)

$$x_{2,2} = |\underline{d}_{q_1}|^2 = \sum_{l=1}^{R} d_{l,q_1}^* \cdot d_{l,q_1}, \text{ and}$$ Eq (28c)

$$x_{1,2} = \underline{d}_{p_1}^H \cdot \underline{d}_{q_1} = \sum_{l=1}^{R} d_{l,p_1}^* \cdot d_{l,q_1},$$ Eq (28d)

where $\underline{d}_{p_1}$ is column $p_1$ of $D_i$, $\underline{d}_{q_1}$ is column $q_1$ of $D_i$, and $d_{l,p_1}$ is the element at location (l, $p_1$) in $D_i$. Indices $p_1$ and $q_1$ are such that $p_1$∈{1, . . . , T}, $q_1$∈{1, . . . , T}, and $p_1 \neq q_1$. Indices $p_1$ and $q_1$ may be selected in a predetermined or deterministic manner.

Eigenvalue decomposition of $X_{p_1 q_1}$ is then performed as shown in equation set (10) to obtain a 2×2 matrix $V_{p_1 q_1}$ of eigenvectors of $X_{p_1 q_1}$. For this eigenvalue decomposition, $R_{2\times 2}$ is replaced with $X_{p_1 q_1}$, and $V_{2\times 2}$ is provided as $V_{p_1 q_1}$. A T×T complex Jacobi rotation matrix $\underline{T}_{p_1 q_1}$ is then formed with matrix $V_{p_1 q_1}$ and contains the four elements of $V_{p_1 q_1}$ at locations ($p_1$, $p_1$), ($p_1$, $q_1$), ($q_1$, $p_1$) and ($q_1$, $q_1$). $\underline{T}_{p_1 q_1}$ has the form shown in equations (21) and (24).

Another 2×2 Hermitian matrix $\underline{Y}_{p_2 q_2}$ is also formed based on the current $D_i$. $\underline{Y}_{p_2 q_2}$ is a 2×2 submatrix of $D_i \cdot D_i^H$ and contains elements at locations ($p_2$, $p_2$), ($p_2$, $q_2$), ($q_2$, $p_2$) and ($q_2$, $q_2$) in $D_i \cdot D_i^H$. The elements of $Y_{p_2 q_2}$ may be computed as follows:

$$\underline{Y}_{p_2 q_2} = \begin{bmatrix} y_{1,1} & y_{1,2} \\ y_{1,2}^* & y_{2,2} \end{bmatrix},$$ Eq (29a)

$$y_{1,1} = |\tilde{\underline{d}}_{p_2}|^2 = \sum_{l=1}^{T} d_{p_2,l} \cdot d_{p_2,l}^*,$$ Eq (29b)

$$y_{2,2} = |\tilde{\underline{d}}_{q_2}|^2 = \sum_{l=1}^{T} d_{q_2,l} \cdot d_{q_2,l}^*, \text{ and}$$ Eq (29c)

-continued $$y_{1,2} = \tilde{d}_{p_2} \cdot \tilde{d}_{q_2}^H = \sum_{l=1}^{T} d_{p_2,l} \cdot d_{q_2,l}^*, \quad \text{Eq (29d)}$$

where $\underline{d}_{p_2}$ is row $p_2$ of $D_i$, $\underline{d}_{q_2}$ is row $q_2$ of $D_i$, and $\underline{d}_{p_2,l}$ is the element at location $(p_2, 1)$ in $D_i$. Indices $p_2$ and $q_2$ are such that $p_2 \in \{1, \ldots, R\}$, $q_2 \in \{1, \ldots, R\}$, and $p_2 \neq q_2$. Indices $p_2$ and $q_2$ may also be selected in a predetermined or deterministic manner.

Eigenvalue decomposition of $Y_{p_2 q_2}$ is then performed as shown in equation set (10) to obtain a 2×2 matrix $U_{p_2 q_2}$ of eigenvectors of $\underline{Y}_{p_2 q_2}$. For this eigenvalue decomposition, $\underline{R}_{2 \times 2}$ is replaced with $\underline{Y}_{p_2 q_2}$, and $V_{2 \times 2}$ is provided as $U_{p_2 q_2}$. An R×R complex Jacobi rotation matrix $\underline{S}_{p_2 q_2}$ is then formed with matrix $U_{p_2 q_2}$ and contains the four elements of $Y_{p_2 q_2}$ at locations $(p_2, p_2)$, $(p_2, q_2)$, $(q_2, p_2)$ and $(q_2, q_2)$. $\underline{S}_{p_2 q_2}$ has the form shown in equations (21) and (24).

Matrix $V_i$ is then updated as follows:

$$V_{i+1} = V_i \cdot \underline{T}_{p_1 q_1}, \quad \text{Eq (30)}$$

Matrix $U_i$ is updated as follows:

$$U_{i+1} = U_i \cdot \underline{S}_{p_2 q_2}, \quad \text{Eq (31)}$$

Matrix $D_i$ is updated as follows:

$$D_{i+1} = \underline{S}_{p_2 q_2}^H \cdot D_i \cdot \underline{T}_{p_1 q_1}, \quad \text{Eq (32)}$$

The iterative process is performed until a termination condition is encountered. Upon termination of the iterative process, the final $V_i$ is a good approximation of $\tilde{V}$, the final $U_i$ is a good approximation of $U$, and the final $D_i$ is a good approximation of $\tilde{\Sigma}$, where $\tilde{V}$ and $\tilde{\Sigma}$ may be rotated versions of $V$ and $\Sigma$, respectively. $V_i$ and $D_i$ may be unrotated as follows:

$$\hat{\Sigma} = D_i \cdot P, \text{ and} \quad \text{Eq (33a)}$$

$$\hat{V} = V_i \cdot P, \quad \text{Eq (33b)}$$

where $P$ is a T×T diagonal matrix with diagonal elements having unit magnitude and phases that are the negative of the phases of the corresponding diagonal elements of $D_i$. $\hat{\Sigma}$ and $\hat{V}$ are the final approximations of $\Sigma$ and $V$, respectively.

For a multi-carrier MIMO system, the iterative process may be performed for each channel response matrix $H(k)$ to obtain matrices $V_i(k)$, $U_i(k)$, and $D_i(k)$, which are approximations matrices $V(k)$, $U(k)$, and $\Sigma(k)$, respectively, for that $H(k)$. For the first SVD embodiment, for each subband k except for the first subband, the final solution $V_i(k-1)$ obtained for the prior subband k−1 may be used as an initial solution for the current subband k, so that $V_0(k) = V_i(k-1)$ and $W_0(k) = H(k) \cdot V_0(k)$. For the second SVD embodiment, for each subband k except for the first subband, the final solutions $V_i(k-1)$ and $U_i(k-1)$ obtained for the prior subband k−1 may be used as initial solutions for the current subband k, so that $V_0(k) = V_i(k-1)$, $U_0(k) = U_i(k-1)$, and $D_0(k) = U_0^H(k) \cdot H(k) \cdot V_0(k)$. The concept may also be used across time or both frequency and time, as described above.

5. System

Figure 6:
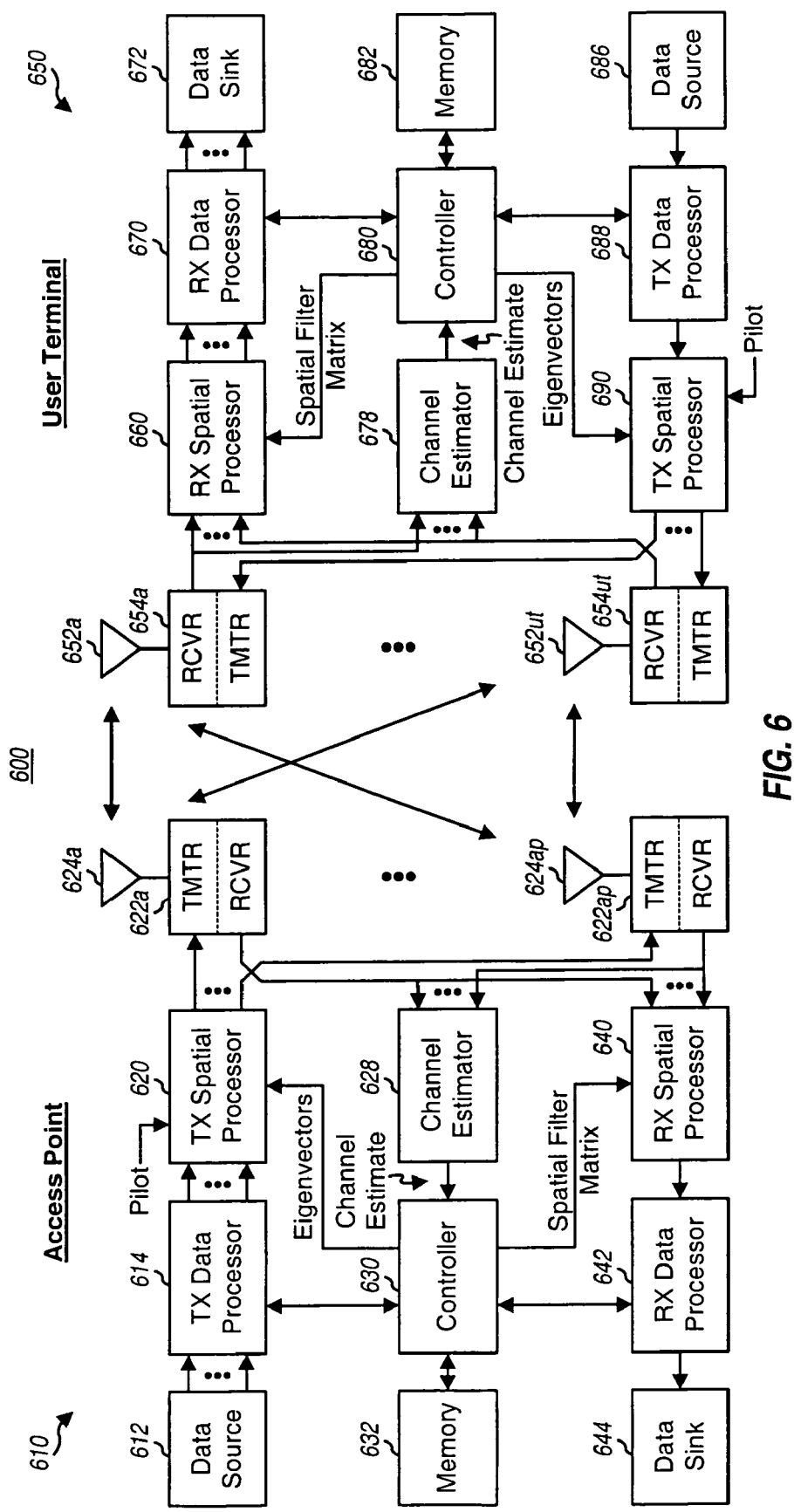
FIG. 6 shows an access point and a user terminal in a MIMO system.

FIG. 6 shows a block diagram of an embodiment of an access point 610 and a user terminal 650 in a MIMO system 600. Access point 610 is equipped with $N_{ap}$ antennas and user terminal 650 is equipped with $N_{ut}$ antennas, where $N_{ap} > 1$ and $N_{ut} > 1$. For simplicity, the following description assumes that MIMO system 600 uses time division duplexing (TDD), and the downlink channel response matrix $H_{dn}(k)$ for each subband k is reciprocal of the uplink channel response matrix $H_{up}(k)$ for that subband, or $H_{dn}(k) = H(k)$ and $H_{up}(k) = H^T(k)$.

On the downlink, at access point 610, a transmit (TX) data processor 614 receives traffic data from a data source 612 and other data from a controller 630. TX data processor 614 formats, encodes, interleaves, and modulates the data and generates data symbols, which are modulation symbols for data. A TX spatial processor 620 multiplexes the data symbols with pilot symbols, performs spatial processing with eigenvectors or right singular vectors if applicable, and provides $N_{ap}$ streams of transmit symbols. Each transmitter unit (TMTR) 622 processes a respective transmit symbol stream and generates a downlink modulated signal. $N_{ap}$ downlink modulated signals from transmitter units 622a through 622ap are transmitted from antennas 624a through 624ap, respectively.

At user terminal 650, $N_{ut}$ antennas 652a through 652ut receive the transmitted downlink modulated signals, and each antenna provides a received signal to a respective receiver unit (RCVR) 654. Each receiver unit 654 performs processing complementary to the processing performed by transmitter units 622 and provides received symbols. A receive (RX) spatial processor 660 performs spatial matched filtering on the received symbols from all receiver units 654a through 654ut and provides detected data symbols, which are estimates of the data symbols transmitted by access point 610. An RX data processor 670 processes (e.g., symbol demaps, deinterleaves, and decodes) the detected data symbols and provides decoded data to a data sink 672 and/or a controller 680.

A channel estimator 678 processes received pilot symbols and provides an estimate of the downlink channel response, $\hat{H}(k)$, for each subband of interest. Controller 680 may decompose each matrix $\hat{H}(k)$ to obtain $\hat{V}(k)$ and $\hat{\Sigma}(k)$, which are estimates of $V(k)$ and $\Sigma(k)$ for $H(k)$. Controller 680 may derive a downlink spatial filter matrix $M_{dn}(k)$ for each subband of interest based on $\hat{V}(k)$, as shown in Table 1. Controller 680 may provide $M_{dn}(k)$ to RX spatial processor 660 for downlink spatial matched filtering and $\hat{V}(k)$ to a TX spatial processor 690 for uplink spatial processing.

The processing for the uplink may be the same or different from the processing for the downlink. Data from a data source 686 and signaling from controller 680 are processed (e.g., encoded, interleaved, and modulated) by a TX data processor 688, multiplexed with pilot symbols, and further spatially processed by TX spatial processor 690 with $\hat{V}(k)$ for each subband of interest. The transmit symbols from TX spatial processor 690 are further processed by transmitter units 654a through 654ut to generate $N_{ut}$ uplink modulated signals, which are transmitted via antennas 652a through 652ut.

At access point 610, the uplink modulated signals are received by antennas 624a through 624ap and processed by receiver units 622a through 622ap to generate received symbols for the uplink transmission. An RX spatial processor 640 performs spatial matched filtering on the received data symbols and provides detected data symbols. An RX data processor 642 further processes the detected data symbols and provides decoded data to a data sink 644 and/or controller 630.

A channel estimator 628 processes received pilot symbols and provides an estimate of either $H^T(k)$ or $U(k)$ for each subband of interest, depending on the manner in which the uplink pilot is transmitted. Controller 630 may receive $\hat{H}^T(k)$ for multiple subbands and decompose each matrix $\hat{H}^T(k)$ to obtain $\hat{U}(k)$. Controller 680 may also derive an uplink spatial filter matrix $M_{up}(k)$ for each subband of interest based on $\hat{U}(k)$. Controller 630 provides $M_{up}(k)$ to RX spatial processor 640 for uplink spatial matched filtering and Û(k) to TX spatial processor 620 for downlink spatial processing.

Controllers 630 and 680 control the operation at access point 610 and user terminal 650, respectively. Memory units 632 and 682 store data and program codes used by controllers 630 and 680, respectively. Controllers 630 and/or 680 may perform eigenvalue decomposition and/or singular value decomposition of the channel response matrices obtained for its link.

The decomposition techniques described herein may be implemented by various means. For example, these techniques may be implemented in hardware, software, or a combination thereof. For a hardware implementation, the processing units used to perform decomposition may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the decomposition techniques may be implemented with modules (e.g., procedures, functions, and so on) that perform the functions described herein. The software codes may be stored in a memory unit (e.g., memory unit 632 or 682 in FIG. 6 and executed by a processor (e.g., controller 630 or 680). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of decomposing a matrix, comprising:
deriving a first set of at least one variable based on a first matrix to be decomposed and using Coordinate Rotational Digital Computer (CORDIC) computation;
deriving a second set of at least one variable based on the first matrix and using a look-up table; and
deriving a second matrix of eigenvectors based on the first and second sets of at least one variable.

2. The method of claim 1, wherein the deriving the first set of at least one variable comprises
performing CORDIC computation on an element of the first matrix to determine magnitude and phase of the element, and
performing CORDIC computation on the phase of the element to determine sine and cosine of the element, and wherein the first set of at least one variable comprises the sine and cosine of the element.

3. The method of claim 1, wherein the deriving the second set of at least one variable comprises
deriving intermediate quantities based on the first matrix, and
deriving the second set of at least one variable based on the intermediate quantities and using the look-up table.

4. The method of claim 3, wherein the deriving the intermediate quantities comprises
deriving a divisor for an intermediate variable based on a first element of the first matrix,
converting the divisor into a first binary floating-point number,
deriving a dividend for the intermediate variable based on second and third elements of the first matrix,
converting the dividend into a second binary floating-point number, and
forming the intermediate quantities based on the first and second floating-point numbers.

5. An apparatus comprising:
a Coordinate Rotational Digital Computer (CORDIC) processor to derive a first set of at least one variable based on a first matrix to be decomposed;
a look-up processor to derive a second set of at least one variable based on the first matrix and using a look-up table; and
a post-processor to derive a second matrix of eigenvectors based on the first and second sets of at least one variable.

6. The apparatus of claim 5, wherein the CORDIC processor performs CORDIC computation on an element of the first matrix to determine magnitude and phase of the element, performs CORDIC computation on the phase of the element to determine sine and cosine of the element, and provides the sine and cosine of the element as the first set of at least one variable.

7. The apparatus of claim 5, wherein the look-up processor derives intermediate quantities based on the first matrix and derives the second set of at least one variable based on the intermediate quantities and using the look-up table.

8. The apparatus of claim 7, wherein the look-up processor derives a divisor for an intermediate variable based on a first element of the first matrix, converts the divisor into a first binary floating-point number, derives a dividend for the intermediate variable based on second and third elements of the first matrix, converts the dividend into a second binary floating-point number, and forms the intermediate quantities based on the first and second floating-point numbers.

9. An apparatus comprising:
means for deriving a first set of at least one variable based on a first matrix to be decomposed and using Coordinate Rotational Digital Computer (CORDIC) computation;
means for deriving a second set of at least one variable based on the first matrix and using a look-up table; and
means for deriving a second matrix of eigenvectors based on the first and second sets of at least one variable.

10. The apparatus of claim 9, wherein the means for deriving the first set of at least one variable comprises
means for performing CORDIC computation on an element of the first matrix to determine magnitude and phase of the element, and
means for performing CORDIC computation on the phase of the element to determine sine and cosine of the element, and wherein the first set of at least one variable comprises the sine and cosine of the element.

11. The apparatus of claim 9, wherein the means for deriving the second set of at least one variable comprises
means for deriving intermediate quantities based on the first matrix, and
means for deriving the second set of at least one variable based on the intermediate quantities and using the look-up table.

12. The apparatus of claim 11, wherein the means for deriving the intermediate quantities comprises
  means for deriving a divisor for an intermediate variable based on a first element of the first matrix,
  means for converting the divisor into a first binary floating-point number,
  means for deriving a dividend for the intermediate variable based on second and third elements of the first matrix,
  means for converting the dividend into a second binary floating-point number, and
  means for forming the intermediate quantities based on the first and second floating-point numbers.

13. A method of decomposing a matrix, comprising:
  deriving intermediate quantities based on a first matrix to be decomposed;
  deriving at least one variable based on the intermediate quantities and using a look-up table; and
  deriving a second matrix of eigenvectors based on the at least one variable.

14. The method of claim 13, wherein the deriving the intermediate quantities based on the first matrix comprises
  deriving a divisor for an intermediate variable based on a first element of the first matrix,
  converting the divisor into a first binary floating-point number,
  deriving a dividend for the intermediate variable based on second and third elements of the first matrix,
  converting the dividend into a second binary floating-point number, and
  forming the intermediate quantities based on the first and second floating-point numbers.

15. The method of claim 14, wherein the forming the intermediate quantities based on the first and second floating-point numbers comprises
  deriving a first intermediate quantity based on a mantissa of the first floating-point number,
  deriving a second intermediate quantity based on a mantissa of the second floating-point number, and
  deriving a third intermediate quantity based on exponents of the first and second floating-point numbers.

16. The method of claim 15, wherein the deriving the at least one variable comprises
  forming an input address for the look-up table based on the first, second, and third intermediate quantities, and
  accessing the look-up table with the input address.

17. An apparatus comprising:
  a pre-processor to derive intermediate quantities based on a first matrix to be decomposed;
  a look-up table to provide at least one variable based on the intermediate quantities; and
  a post-processor to derive a second matrix of eigenvectors based on the at least one variable.

18. The apparatus of claim 17, wherein the pre-processor derives a divisor for an intermediate variable based on a first element of the first matrix, converts the divisor into a first binary floating-point number, derives a dividend for the intermediate variable based on second and third elements of the first matrix, converts the dividend into a second binary floating-point number, and forms the intermediate quantities based on the first and second floating-point numbers.

19. The apparatus of claim 18, wherein the pre-processor further derives a first intermediate quantity based on a mantissa of the first floating-point number, derives a second intermediate quantity based on a mantissa of the second floating-point number, derives a third intermediate quantity based on exponents of the first and second floating-point numbers, and forms an input address for the look-up table based on the first, second, and third intermediate quantities.

20. The apparatus of claim 17, wherein the look-up table has a size selected based on desired accuracy for the at least one variable.

21. An apparatus comprising:
  means for deriving intermediate quantities based on a first matrix to be decomposed;
  means for deriving at least one variable based on the intermediate quantities and using a look-up table; and
  means for deriving a second matrix of eigenvectors based on the at least one variable.

22. The apparatus of claim 21, wherein the means for deriving the intermediate quantities based on the first matrix comprises
  means for deriving a divisor for an intermediate variable based on a first element of the first matrix,
  means for converting the divisor into a first binary floating-point number,
  means for deriving a dividend for the intermediate variable based on second and third elements of the first matrix,
  means for converting the dividend into a second binary floating-point number, and
  means for forming the intermediate quantities based on the first and second floating-point numbers.

23. The apparatus of claim 22, wherein the means for forming the intermediate quantities based on the first and second floating-point numbers comprises
  means for deriving a first intermediate quantity based on a mantissa of the first floating-point number,
  means for deriving a second intermediate quantity based on a mantissa of the second floating-point number, and
  means for deriving a third intermediate quantity based on exponents of the first and second floating-point numbers.

24. A method of decomposing a matrix, comprising:
  performing Coordinate Rotational Digital Computer (CORDIC) computation on an element of a first matrix to determine magnitude and phase of the element;
  performing CORDIC computation on the phase of the element to determine sine and cosine of the element; and
  deriving a second matrix of eigenvectors based on the magnitude, sine, and cosine of the element.

25. The method of claim 24, wherein the CORDIC computation on the element to determine the magnitude and phase of the element and the CORDIC computation on the phase of the element to determine sine and cosine of the element are performed in parallel.

26. The method of claim 24, wherein the CORDIC computation on the element to determine the magnitude and phase of the element and the CORDIC computation on the phase of the element to determine sine and cosine of the element are performed for a predetermined number of iterations.

27. An apparatus comprising:
  means for performing Coordinate Rotational Digital Computer (CORDIC) computation on an element of a first matrix to determine magnitude and phase of the element;
  means for performing CORDIC computation on the phase of the element to determine sine and cosine of the element; and
  means for deriving a second matrix of eigenvectors based on the magnitude, sine, and cosine of the element.

28. A method of decomposing a matrix, comprising:
  performing a plurality of iterations of Jacobi rotation on a first matrix of complex values with a plurality of Jacobi rotation matrices, each Jacobi rotation matrix being derived by performing eigenvalue decomposition of a correlation submatrix using Coordinate Rotational Digital Computer (CORDIC) computation, a look-up table, or both the CORDIC computation and the look-up table; and deriving a first unitary matrix with orthogonal vectors based on the plurality of Jacobi rotation matrices.

29. The method of claim 28, wherein the performing the plurality of iterations of the Jacobi rotation comprises, for each iteration, forming the submatrix based on the first matrix, decomposing the submatrix using the CORDIC computation, the look-up table, or both the CORDIC computation and the look-up table to obtain eigenvectors of the submatrix, forming a Jacobi rotation matrix with the eigenvectors, and updating the first matrix with the Jacobi rotation matrix.

30. The method of claim 29, wherein the decomposing the submatrix comprises deriving a first set of at least one variable based on the submatrix and using the CORDIC computation, deriving a second set of at least one variable based on the submatrix and using the look-up table, and deriving the eigenvectors of the submatrix based on the first and second sets of at least one variable.

31. The method of claim 28, further comprising:

deriving a diagonal matrix of eigenvalues based on the plurality of Jacobi rotation matrices.

32. The method of claim 28, further comprising:

deriving a second matrix of complex values based on the plurality of Jacobi rotation matrices; and deriving a second unitary matrix with orthogonal vectors based on the second matrix.

33. The method of claim 32, further comprising:

deriving a diagonal matrix of singular values based on the second matrix.

34. The method of claim 28, further comprising:

deriving a second unitary matrix with orthogonal vectors based on the plurality of Jacobi rotation matrices.

35. The method of claim 34, further comprising:

deriving a diagonal matrix of singular values based on the plurality of Jacobi rotation matrices.

36. An apparatus comprising:

means for performing a plurality of iterations of Jacobi rotation on a first matrix of complex values with a plurality of Jacobi rotation matrices, each Jacobi rotation matrix being derived by performing eigenvalue decomposition of a correlation submatrix using Coordinate Rotational Digital Computer (CORDIC) computation, a look-up table, or both the CORDIC computation and the look-up table; and means for deriving a first unitary matrix with orthogonal vectors based on the plurality of Jacobi rotation matrices.

37. The apparatus of claim 36, wherein the means for performing the plurality of iterations of the Jacobi rotation comprises, for each iteration, means for forming the submatrix based on the first matrix, means for decomposing the submatrix using the CORDIC computation, the look-up table, or both the CORDIC computation and the look-up table to obtain eigenvectors of the submatrix, means for forming a Jacobi rotation matrix with the eigenvectors, and means for updating the first matrix with the Jacobi rotation matrix.

38. The apparatus of claim 37, wherein the means for decomposing the submatrix comprises means for deriving a first set of at least one variable based on the submatrix and using the CORDIC computation, means for deriving a second set of at least one variable based on the submatrix and using the look-up table, and means for deriving the eigenvectors of the submatrix based on the first and second sets of at least one variable.

39. A method of decomposing matrices, comprising:

obtaining a plurality of matrices of complex values for a plurality of transmission spans;

performing a plurality of iterations of Jacobi rotation on a first matrix of complex values for a first transmission span to obtain a first unitary matrix with orthogonal vectors, wherein each iteration of the Jacobi rotation utilizes eigenvalue decomposition of a correlation submatrix using Coordinate Rotational Digital Computer (CORDIC) computation, a look-up table, or both the CORDIC computation and the look-up table; and performing a plurality of iterations of the Jacobi rotation on a second matrix of complex values for a second transmission span to obtain a second unitary matrix with orthogonal vectors, wherein the first unitary matrix is used as an initial solution for the second unitary matrix, wherein the first and second matrices are among the plurality of matrices, and wherein the first and second transmission spans are among the plurality of transmission spans.

40. The method of claim 39, further comprising:

for each remaining one of the plurality of matrices of complex values, performing a plurality of iterations of the Jacobi rotation on the matrix of complex values to obtain a unitary matrix with orthogonal vectors, wherein another unitary matrix obtained for another one of the plurality of matrices is used as an initial solution for the unitary matrix.

41. The method of claim 39, further comprising:

selecting the plurality of matrices in sequential order for decomposition.

42. The method of claim 39, wherein the plurality of transmission spans correspond to a plurality of frequency subbands in a multi-carrier communication system.

43. The method of claim 39, wherein the plurality of transmission spans correspond to a plurality of time intervals.

44. The method of claim 39, wherein the plurality of matrices of complex values are a plurality of channel response matrices for a plurality of frequency subbands.

45. An apparatus comprising:

means for obtaining a plurality of matrices of complex values for a plurality of transmission spans;

means for performing a plurality of iterations of Jacobi rotation on a first matrix of complex values for a first transmission span to obtain a first unitary matrix with orthogonal vectors, wherein each iteration of the Jacobi rotation utilizes eigenvalue decomposition of a correlation submatrix using Coordinate Rotational Digital Computer (CORDIC) computation, a look-up table, or both the CORDIC computation and the look-up table; and means for performing a plurality of iterations of the Jacobi rotation on a second matrix of complex values for a second transmission span to obtain a second unitary matrix with orthogonal vectors, wherein the first unitary matrix is used as an initial solution for the second unitary matrix, wherein the first and second matrices are among the plurality of matrices, and wherein the first and second transmission spans are among the plurality of transmission spans.

46. The apparatus of claim 45, further comprising:

means for, for each remaining one of the plurality of matrices of complex values, performing a plurality of iterations of the Jacobi rotation on the matrix of complex values to obtain a unitary matrix with orthogonal vectors, wherein another unitary matrix obtained for another one of the plurality of matrices is used as an initial solution for the unitary matrix.

* * * * *